United States Patent
Yun et al.

(10) Patent No.: US 9,965,137 B2
(45) Date of Patent: May 8, 2018

(54) TRANSPARENT DISPLAY APPARATUS AND OBJECT SELECTION METHOD USING THE SAME

(71) Applicant: SAMSUNG ELECTRONICS CO., LTD., Suwon-si (KR)

(72) Inventors: Il-kook Yun, Suwon-si (KR); Geun-ho Lee, Seongnam-si (KR); Chang-soo Lee, Seosan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 432 days.

(21) Appl. No.: 14/022,530

(22) Filed: Sep. 10, 2013

(65) Prior Publication Data

US 2014/0075349 A1   Mar. 13, 2014

(30) Foreign Application Priority Data

Sep. 10, 2012 (KR) .................. 10-2012-0099737

(51) Int. Cl.
*G06F 3/0481* (2013.01)
*G06F 3/0484* (2013.01)
(Continued)

(52) U.S. Cl.
CPC ............ *G06F 3/0481* (2013.01); *G06F 3/012* (2013.01); *G06F 3/013* (2013.01); *G06F 3/017* (2013.01); *G06F 3/0304* (2013.01); *G06F 3/0325* (2013.01); *G06F 3/0488* (2013.01); *G06F 3/04815* (2013.01); *G06F 3/04842* (2013.01); *G06F 17/30032* (2013.01); *G06F 17/30041* (2013.01); *G06K 9/00671* (2013.01); *G06T 19/006* (2013.01); *H04N 21/42207* (2013.01)

(58) Field of Classification Search
CPC . G06K 9/00671; G06F 3/04842; G06F 3/017; G06F 3/0325; G06F 3/013; G06F 3/0488; G06F 3/041; G06F 3/0416; H04N 21/42207; H04N 21/4222; H04N 5/4403; G06T 7/004; G06T 19/006
See application file for complete search history.

(56) References Cited

U.S. PATENT DOCUMENTS

| 5,506,717 A * | 4/1996 | Kho | ....................... | H04B 1/202 |
| | | | | 340/539.21 |
| 6,216,087 B1 * | 4/2001 | Want | ........................ | G01S 1/70 |
| | | | | 701/408 |

(Continued)

FOREIGN PATENT DOCUMENTS

| CN | 102402287 A | 4/2012 |
| CN | 102402390 A | 4/2012 |

(Continued)

OTHER PUBLICATIONS

Looser et al., An Evaluation of Virtual Lenses for Object Selection in Augmented Reality, 2007.*

(Continued)

*Primary Examiner* — Nicholas Ulrich
(74) *Attorney, Agent, or Firm* — Sughrue Mion, PLLC

(57) ABSTRACT

A transparent display apparatus and an object selection method thereof for selecting objects disposed on one side of the transparent display apparatus opposite to a user on another side of the transparent display apparatus.

30 Claims, 15 Drawing Sheets

(51) Int. Cl.
*G06F 3/03* (2006.01)
*G06F 3/0488* (2013.01)
*G06K 9/00* (2006.01)
*G06T 19/00* (2011.01)
*H04N 21/422* (2011.01)
*G06F 3/01* (2006.01)
*G06F 17/30* (2006.01)

(56) References Cited

U.S. PATENT DOCUMENTS

| | | |
|---|---|---|
| 6,545,669 B1 | 4/2003 | Kinawi et al. |
| 8,230,075 B1 | 7/2012 | Weskamp et al. |
| 8,606,430 B2 | 12/2013 | Seder et al. |
| 8,990,682 B1* | 3/2015 | Wong .................. G02B 27/017 715/254 |
| 9,298,346 B2* | 3/2016 | Le Clerc .................. G06F 3/017 |
| 2003/0020707 A1* | 1/2003 | Kangas .................. G06F 3/011 345/418 |
| 2004/0141173 A1* | 7/2004 | Rekimoto .............. G01C 15/00 356/141.5 |
| 2006/0262140 A1 | 11/2006 | Kujawa et al. |
| 2007/0164988 A1* | 7/2007 | Ryu ........................ G06F 3/013 345/156 |
| 2008/0192027 A1* | 8/2008 | Morrison ................ G06Q 30/02 345/177 |
| 2010/0134340 A1* | 6/2010 | Sotomaru .............. G08C 17/02 341/176 |
| 2010/0144436 A1* | 6/2010 | Marks .................... G06F 3/017 463/36 |
| 2010/0146461 A1* | 6/2010 | Ryu ........................ G06F 3/013 715/863 |
| 2010/0287500 A1* | 11/2010 | Whitlow ................ G02B 27/01 715/810 |
| 2011/0084893 A1 | 4/2011 | Lee et al. |
| 2011/0138317 A1* | 6/2011 | Kang ...................... G06F 3/011 715/780 |
| 2011/0138416 A1* | 6/2011 | Kang ...................... G06F 3/0482 725/39 |
| 2011/0246894 A1 | 10/2011 | Luo et al. |
| 2011/0260965 A1 | 10/2011 | Kim et al. |
| 2012/0038668 A1* | 2/2012 | Kim ........................ G06F 3/011 345/633 |
| 2012/0038669 A1* | 2/2012 | Lee ........................ G06F 3/011 345/633 |
| 2012/0050324 A1* | 3/2012 | Jeong .................... G06F 17/30 345/633 |
| 2012/0069050 A1 | 3/2012 | Park et al. |
| 2012/0072873 A1 | 3/2012 | Park et al. |
| 2012/0075343 A1* | 3/2012 | Chen ...................... G09G 5/397 345/633 |
| 2012/0088526 A1* | 4/2012 | Lindner .............. H04M 1/72522 455/457 |
| 2012/0089273 A1 | 4/2012 | Seder et al. |
| 2012/0105447 A1* | 5/2012 | Kim .................. H04N 21/42226 345/419 |
| 2012/0113140 A1* | 5/2012 | Hilliges ................ G06F 3/0304 345/633 |
| 2012/0256886 A1* | 10/2012 | Ryu ........................ G06F 1/1632 345/204 |
| 2013/0044912 A1* | 2/2013 | Kulkarni ............ G06K 9/00671 382/103 |
| 2013/0141461 A1* | 6/2013 | Salter .................... G06T 7/0044 345/633 |
| 2013/0293530 A1* | 11/2013 | Perez .................. G06K 9/00671 345/418 |
| 2014/0104316 A1* | 4/2014 | Sharma ................ G06F 1/1626 345/633 |
| 2014/0337016 A1* | 11/2014 | Herbig .................. G06T 7/0042 704/201 |

FOREIGN PATENT DOCUMENTS

| | | |
|---|---|---|
| CN | 102442250 A | 5/2012 |
| EP | 2431895 A1 | 3/2012 |
| EP | 2431916 A2 | 3/2012 |
| EP | 2500814 A2 | 9/2012 |
| EP | 2657929 A2 | 10/2013 |
| WO | 03/062944 A2 | 7/2003 |
| WO | 2012054063 A1 | 4/2012 |

OTHER PUBLICATIONS

Gervautz et al., Anywhere Interfaces Using Hnadheld Augmented Reality, Jul. 2012.*
Communication dated Jun. 29, 2015, issued from the European Patent Office in counterpart in European Application No. 13183710.6.
Azuma R et al: "Recent advances in augmented reality", IEEE Computer Graphics and Applications, IEEE Service Center, New York, NY, US, vol. 21, No. 6, Dec. 30, 2001 (Dec. 30, 2001), pp. 34-47, XP011093930.
Ronald T Azuma: "A Survey of Augmented Reality" Presence, Cambridge, MA, US, Aug. 4, 1997 (Aug. 4, 1997), pp. 1-48, XP002254668.
International Search Report, dated Jan. 28, 2014, issued by the International Searching Authority in counterpart International Application No. PCT/KR2013/008104.
Communication dated Oct. 26, 2016, issued by the European Patent Office in counterpart European Patent Application No. 13183710.6.
Communication dated Dec. 6, 2016, issued by the State Intellectual Property Office of the People's Republic of China in counterpart Chinese Patent Application No. 201380047074.4.
Communication dated Jun. 22, 2017, issued by the State Intellectual Property Office of P.R. China in counterpart Chinese Application No. 201380047074.4.
Communication dated Nov. 10, 2017 by the State Intellectual Property Office of P.R. China in counterpart Chinese Patent Application No. 201380047074.4.

* cited by examiner

TRANSPARENT DISPLAY APPARATUS AND OBJECT SELECTION METHOD USING THE SAME

CROSS-REFERENCE TO RELATED PATENT APPLICATION

This application claims priority from Korean Patent Application No. 10-2012-0099737, filed on Sep. 10, 2012, in the Korean Intellectual Property Office, the disclosure of which is incorporated herein by reference in its entirety.

BACKGROUND

1. Field

Exemplary embodiments consistent with the exemplary embodiments relate to a method of selecting an object, by using a transparent display apparatus, and a transparent display apparatus that selects an object, and more particularly, to a method of selecting an object, by using a transparent display apparatus, in consideration of an intention of a user, and the transparent display apparatus for selecting the object in consideration of the intention of the user.

2. Description of the Related Art

Various types of display apparatuses are used in diverse fields. Particularly, these days, there is an increased amount of research and discussion regarding a next-generation display apparatus, such as a transparent display apparatus.

A transparent display apparatus is an apparatus that is formed of a transparent display panel so that objects may be viewed through the display panel. Conventionally, a display panel is manufactured by using an opaque semiconductor compound such as silicon (Si), gallium arsenic (GaAs), or the like. However, as various application fields, which may not be handled by using a conventional display panel, have been developed, attempts to develop new types of electronic devices have been made. As a result, a transparent display apparatus has been developed.

A transparent display apparatus is implemented to include a transparent oxide semiconductor layer, and thus, has transparent characteristics. When using a transparent display apparatus, while a user views an object, located at an opposite side of the transparent display apparatus, and necessary information through a screen of the transparent display apparatus, the user may input information to the transparent display apparatus.

Additionally, the transparent display apparatus may perform various functions by communicating with other equipment. For example, the transparent display apparatus may be communicatively connected to home appliances, such as a television or an air conditioner, that may communicate with each other, so that video content may be provided or a product may be controlled.

However, in order for the transparent display apparatus to perform a function with respect to an object, a method and a device for selecting an object from among a plurality of objects, with respect to which the transparent display apparatus may perform a function according to its characteristics, are necessary.

SUMMARY

Aspects of the exemplary embodiments provide a transparent display apparatus for selecting an object, and an object selection method using the same.

Aspects of the exemplary embodiments also provide a transparent display apparatus and a method of displaying information about an object selected.

According to an aspect of an exemplary embodiment, there is provided an object selection method of a transparent display apparatus interposed between a user and an object, the method comprising: detecting the object; receiving information that indicates a selection of the object by the user; and selecting the object, based on the information.

The method may further include determining a location, in which information about the selected object is to be displayed on a screen of the transparent display apparatus, based on a location of the user and a location of the object; and displaying the information about the object on the screen at the determined location.

The displaying of the information about the object may include displaying a shape of the object.

The method may further include changing a location at which the information about the selected object is displayed, according to an input.

The information may include a location of the user or a viewing direction of the user, and the selecting may include selecting the object based on the location of the user or the viewing direction of the user.

The selecting may include performing infrared (IR) communication based on the determined location or direction; receiving identification information from the object which received a signal through the IR communication; and selecting the object, based on the received identification information.

The selecting may include transmitting, by the transparent display apparatus, a request for transmitting a predetermined IR signal to the object; identifying a direction, in which the object is located, according to a direction from which a response to the predetermined IR signal has been received; and selecting the object based on the direction.

The selecting may include synchronizing the transparent display apparatus with the object; transmitting information for requesting the object to generate light at a predetermined point of time via a light-emitting device included in the object; capturing an image which includes the light generated by the light-emitting device at the predetermined point of time; determining a location of the object, based on a location of the light in the captured image; and selecting the object based on the location.

The selecting may include recognizing a location of the object by using an ultrasonic recognition device; and selecting the object based on the location.

The selecting may include: transmitting information about a gesture to at least one of the objects; recognizing the transmitted gesture; determining a location in which the gesture is recognized as a location of the object; and selecting the object based on the location of the object.

The selecting may include identifying a location of the object by using machine-to-machine (M2M) communication; and selecting the object based on the location.

The method may include displaying identification information of the object on the transparent display apparatus; the receiving may include receiving a voice input which corresponds to the identification information by using voice recognition; and the selecting may include selecting the object according to the identification information which corresponds to the voice input.

The detecting may include selectively receiving identification information about an object which is located in an area that the user may view through the transparent display apparatus.

The detecting may include receiving identification information from at least one object and selectively displaying information about the object which is located in an area that the user may view through the transparent display apparatus, from among the at least one object whose identification information is received.

The selecting of the object may include obtaining an image which comprises a shape of the object; identifying a location of the object, based on image recognition of the obtained image; and selecting the object according to the identified location.

According to an aspect of an exemplary embodiment, there is provided a transparent display apparatus, including an information transmitting and receiving unit configured to detect an object disposed on a first side of the transparent display apparatus; a user detection unit configured to receive information that indicates a selection of the object by a user disposed on a second side of the transparent display apparatus opposite the first side; and an object selection unit configured to select the object, based on information.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

The exemplary embodiments will now be described more fully with reference to the accompanying drawings, in which exemplary embodiments are shown. The exemplary embodiments may, however, be embodied in many different forms and should not be construed as being limited to the exemplary embodiments set forth herein. In the description, certain detailed explanations of the related art are omitted when it is deemed that they may unnecessarily obscure the essence of the inventive concept. Like numbers refer to like elements throughout the description of the figures.

It will be understood that when a region is referred to as being "connected to" another region, the region can be "directly connected to" another region or "electrically connected to" another region, or intervening elements may be present. It will be further understood that the terms "comprises" and/or "comprising" when used in this specification, specify the presence of elements and/or components, but do not preclude the presence or addition of one or more other elements, components, and/or groups thereof.

Hereinafter, the exemplary embodiments will be described in detail with reference to the attached drawings.

Figure 1:
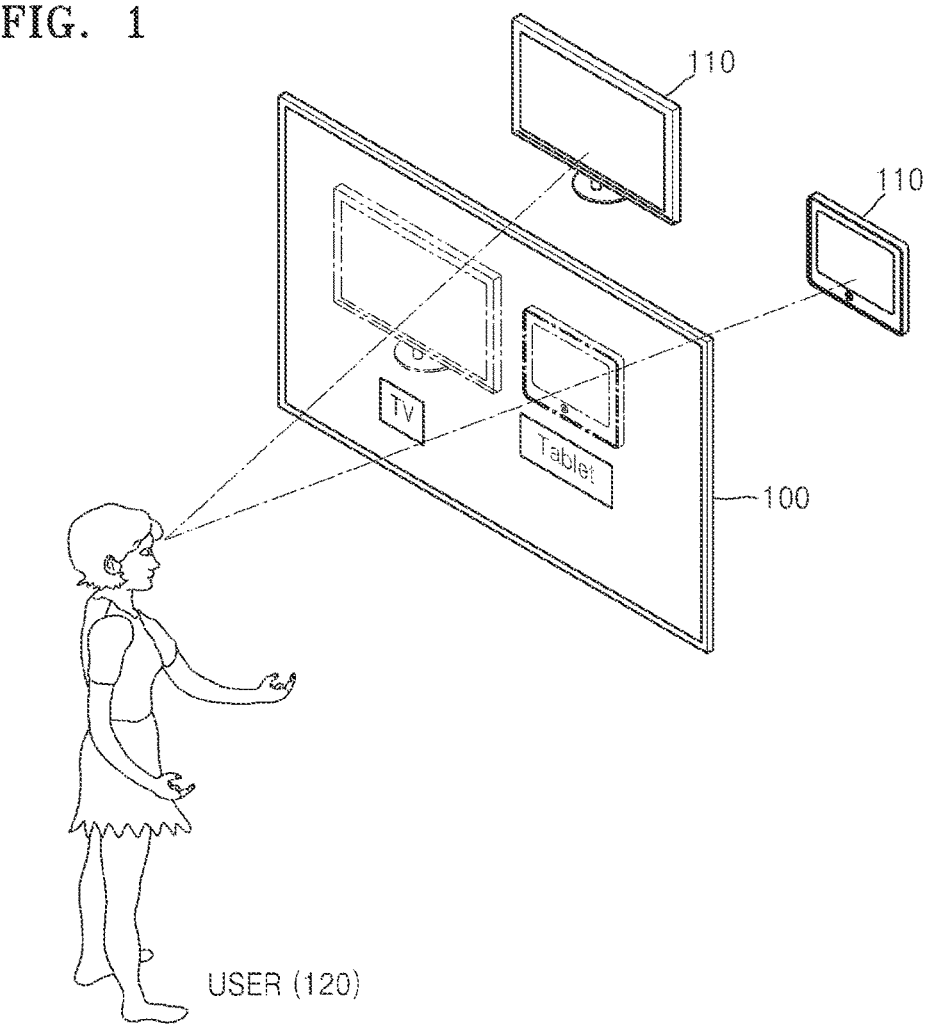
FIG. 1 is a diagram illustrating an operation of a transparent display apparatus, according to an exemplary embodiment.

FIG. 1 is a diagram illustrating an operation of a transparent display apparatus 100, according to an exemplary embodiment.

The transparent display apparatus 100 is implemented to include a transparent display screen so that a user 120 may view through the transparent display screen an object 110 which is located at an opposite side of the transparent display apparatus 100 from the user.

As illustrated in FIG. 1, when at least one object 110 is located to face a second surface that is an opposite side of a first surface that faces the user 120, the user 120 may view the object 110 through the transparent display apparatus 100.

According to an exemplary embodiment, the object 110 may be a device that is communicatively connected to the transparent display apparatus 100. For example, the object 110 may be a television, a refrigerator, or an air conditioner that may communicate with the transparent display apparatus 100.

Communication between the transparent display apparatus 100 and the object 110 includes all types of wireless and wired communication methods that allow data communication. For example, the transparent display apparatus 100 and the object 110 may be communicatively connected to each other through near-field communication (NFC) according to wireless internet communication or Bluetooth communication standards.

The transparent display apparatus 110 may transmit data to and receive data from the object 110 or may control the object 110 through a communicative connection with the object 110. For example, the transparent display apparatus 100 may receive identification information about the object 110 or various information about the object 110 from the object 110. As another example, the transparent display apparatus 100 may transmit content stored in the transparent display apparatus 100 to the object 110 so that the object 110 may display the transmitted content.

The identification information about the object 110 may include an identification (ID) for identifying the object 110 or information for accessing the object 110. For example, an internet protocol (IP) address of the object 110 may be included in the identification information about the object 110.

Additionally, the information about the object 110 may include various information related to the object 110 such as a shape of the object 110, a type of the object 110, a color of the object 110, and an image related to the object 110. For example, if the object 110 is a monitor, the information about the object 110 may include a monitor-shaped icon.

The transparent display apparatus 100, according to an exemplary embodiment, may recognize a location of the user 120 and a location of the object 110 with regard to the transparent display apparatus 100. The transparent display apparatus 100 may detect a location of the user 120 and a location of the object 110 in various ways. A method in which the transparent display apparatus 110 detects the user 120 and the object 110 will be described in detail below.

Figure 2:
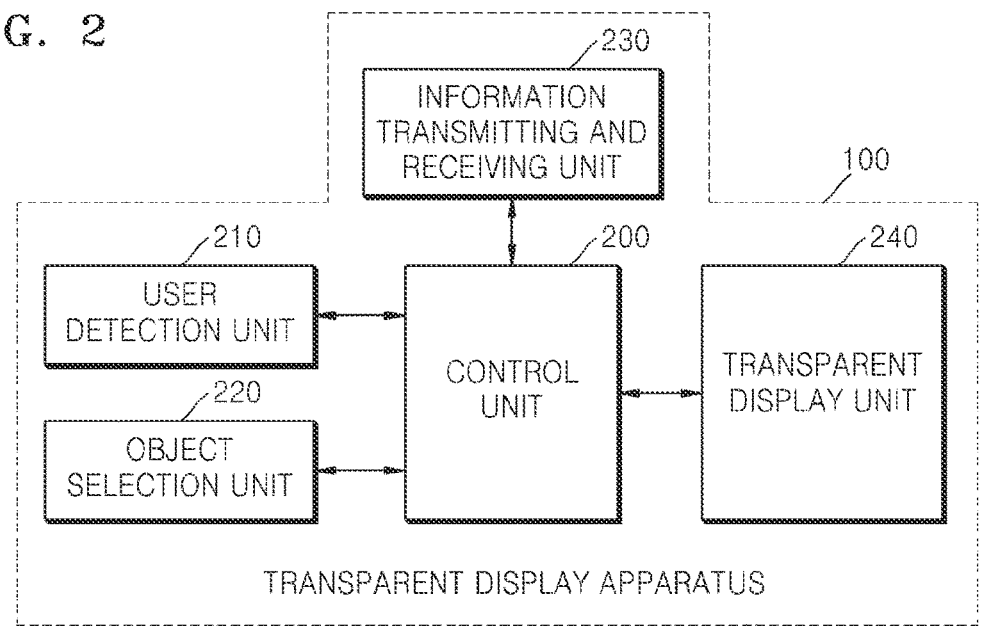
FIG. 2 is a block diagram for explaining a configuration of the transparent display apparatus, according to an exemplary embodiment.

FIG. 2 is a block diagram for explaining a configuration of the transparent display apparatus 100, according to an exemplary embodiment.

The transparent display apparatus 100 may include a user detection unit 210, an object selection unit 220, an information transmitting and receiving unit 230, a transparent display unit 240, and a control unit 200.

The user detection unit 210 may identify a location of the user 120 relative to the first surface of the transparent display apparatus 100, and thus, obtains information about an intention of the user 120 based on the location of the user 120. The object selection unit 220 may select an object which corresponds to information about the intention of the user 120. The information transmitting and receiving unit 230 may communicate with the object 110, and receive identification information about the object 110 from the object 110. The transparent display unit 240 may display information on a transparent screen. The control unit 200, for example a processor, may control the respective units of the transparent display apparatus 100.

The user detection unit 210 and the object selection unit 220 may be implemented partially or entirely as one structure with the control unit 200, according to an implementation design.

Additionally, information about an intention of the user 120 is information about the object 110 that the user 120 desires to select, with regard to a method in which the transparent display apparatus 100 selects an object. For example, the information about an intention of the user 120 may include information about a gaze direction of the user 120, information about a touch input of the user 120 to the transparent display apparatus 120, or information about a voice input from the user 120.

The user detection unit 210 may obtain information about an intention of the user 120 in various ways. The information about an intention of the user 120 is information for selecting the object 110, which the user 120 desires to select, by analyzing a behavior or an operation of the user 120.

As an example, the user detection unit 210 may detect a gaze direction of the user 120, thus obtaining information about an intention of the user 120. For example, the user detection unit 210 may detect an eye pupil of the user 120 from an image captured by using an imaging device, thus identifying a gaze direction of the user 120 according to a motion of the eye pupil. The user detection unit 210 may estimate an intention of the user 120 for selecting the object 110 located in a gaze direction of the user 120, and obtain information about the estimated intention of the user 120. As another example, the detection unit 210 may detect a contour of an eye, a nose, and an entire face of the user 120 from an image captured by using an imaging device, and estimate a direction toward which the face of the user 120 is facing, according to a relative location of the detected contour of the eye, the nose, and the entire face.

As another example, the user detection unit 210 may obtain information about an intention of the user 120 from a touch input to the transparent display apparatus 100. For example, the information about the intention of the user 120 may include information about a location of the user 120 and a touch input information. According to the information about the intention of the user 120, the user detection unit 210 may determine that the user 120 desires to select the object 110 located on an extended line of a line connecting a location of the user 120 to a point to which a touch input is made on the transparent display apparatus 100.

As another example, the user detection unit 210 may obtain information about an intention of the user 120 from a voice input. For example, when a result of voice input recognition corresponds to one of the objects 110, the user detection unit 210 may recognize that a user may select the object 110 corresponding to the result of the voice input recognition.

Additionally, the user detection unit 210 may identify a location of a user in various ways.

As an example, the user detection unit 210 may capture a rear background image by using an imaging device such as a camera. Then, the user detection unit 210 may analyze the captured image to identify a distance from an object, a location of the object, and the like. For example, the user detection unit 210 may detect an edge of each object by employing information about each image pixel of an image captured by using an imaging device. The user detection unit 210 may detect an area, in which a user is photographed, from an image captured by using the detected edge, and identify a location of the user according to the detected area.

As another example, the user detection unit 210 may detect an intensity of incident light by using an optical sensor and may analyze light intensity distribution of the light, thus identifying a location of a user. The optical sensor may be implemented by using a photodiode, a phototransistor, a charge-coupled device (CCD), and may be uniformly distributed over an entire area of the transparent display unit 240. Each optical sensor estimates the intensity of incident light. Generally, when a color of an object is different from a color of a background of the object, an intensity of light reflected from the object becomes different from an intensity of light reflected from the background of the object. Accordingly, the user detection unit 210 may detect intensity of respective reflected light which passes through the transparent display unit 240, and determine a location of the optical sensor through which reflective light with a different intensity is incident, according to a location of the user 120.

As another example, a location of the user 120 may be preset for a predetermined location with regard to the transparent display apparatus 100. For example, a location of the user 120 may be preset as a location which is away from a center of the first surface of the transparent display apparatus 100 for a certain distance.

As another example, a location of the user 120 may be directly input by the user 120 or another user. In such a case, the user detection unit 210 may include various input elements such as a touch screen, a keyboard, a mouse, a joystick, a touch pad, buttons, or the like.

In addition to the exemplary embodiment described above, the user detection unit 210 may recognize a gesture of the user 120 or text. For example, the user detection unit 210 may recognize a direction in which a hand of the user 120 moves, in addition to a gaze direction or a location of the user 120.

The object selection unit 220 may select an object from among the objects 110 located to face the second surface opposite of the first surface of the transparent display apparatus 100, according to information about an intention of the user obtained from the user detection unit 210.

According to an exemplary embodiment, the object selection unit 220 may select an object according to a location or a direction of the object 110. Additionally, according to another exemplary embodiment, the object selection unit 220 may select an object according to a result of voice recognition of a voice input, and identification information received from the object 110.

Additionally, according to an exemplary embodiment, the object selection unit 220 may include a location detection unit 710 for identifying a location or a direction of the object 110, and a determination unit for selecting the object 110 according to a location or a direction of the location detection unit 710 and the object 110.

The information transmitting and receiving unit 230 may transmit and receive information based on a communicative connection with the object 110. The information transmitting and receiving unit 230 may receive identification information from the object 110. Additionally, the information transmitting and receiving unit 230 may transmit information which includes a request for controlling the object 110.

The transparent display unit 240 displays information on a transparent screen. The transparent display unit 240 may be implemented as various display types such as a transparent liquid-crystal display (LCD) type, a transparent thin-film electroluminescent (TFEL) panel type, a transparent organic light-emitting diode (OLED) type, or a transmissive type.

The transparent LCD type means a transparent display apparatus which is implemented by removing a backlight unit from a currently used LCD device, and using a pair of polarizers, an optical film, a thin-film transistor (TFT), and a transparent electrode. The transparent LCD type has low transmissibility due to a polarizer or an optical film, and has low optical efficiency due to nearby light used instead of a backlight unit. However, the transparent LCD type may implement a large-sized transparent display. The transparent TEFL type means a device which employs an alternating current-thin-film electroluminescent (AC-TEFL) display device which consists of a transparent electrode, an inorganic fluorescent body, and an insulating layer. The AC-TFEL display device is a display which emits light when an accelerated electron passes through inside of the inorganic fluorescent body and excites the inorganic fluorescent body. When the transparent display unit 240 is implemented as a transparent TEFL type, the control unit 200 may determine a location in which information is displayed, by adjusting an electron to be projected to an appropriate location. Since the inorganic fluorescent body and the insulating layer have transparent characteristics, a very transparent display may be implemented.

The transparent OLED type is a transparent display apparatus which employs an OLED which allows self-activated luminescence. Since an organic light-emitting layer is transparent, when a transparent electrode is used for electrodes at both sides of the organic light-emitting layer, the transparent OLED type may be implemented as a transparent display apparatus. An OLED emits light when an electron and a hole are injected at both sides of the organic light-emitting layer, and thus, combine in the organic light-emitting layer. By using this technique, a transparent OLED device displays information by injecting an electron and a hole to a desired location.

The control unit controls the respective units. Additionally, in FIG. 2, the control unit 200 is illustrated to be in a structure separate from the user detection unit 210, the object selection unit 210, and the information transmitting and receiving unit 230. However, the control unit 200 may execute information processing for the user detection unit 210, the object selection unit 220, and the information transmitting and receiving unit 230.

Figure 3:
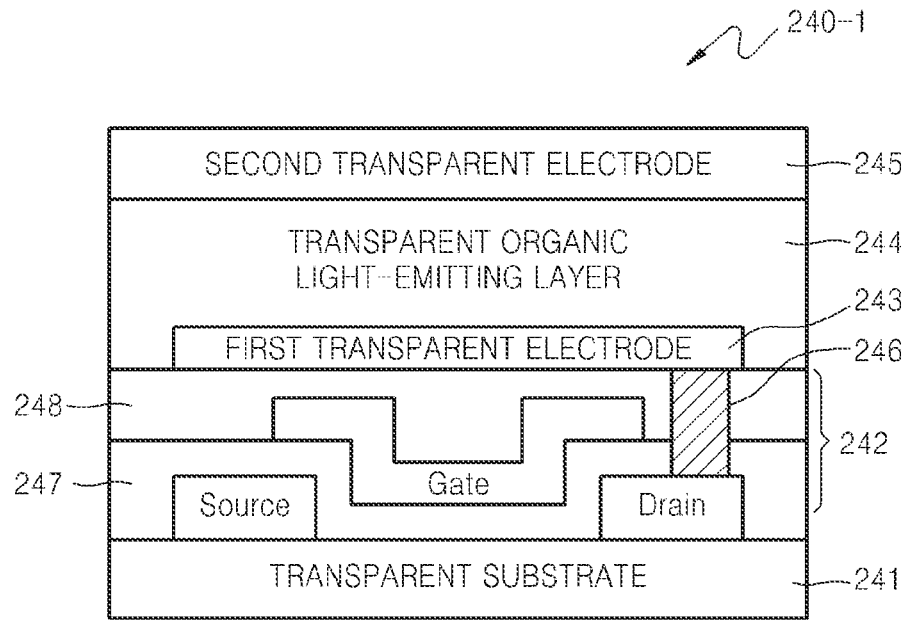
FIG. 3 is a diagram illustrating an example of a detailed configuration of a transparent display unit that may be applied to the transparent display apparatus.

FIG. 3 is a diagram illustrating an example of a detailed configuration of a transparent display unit 240-1 that may be applied to the transparent display apparatus. The transparent display unit 240-1 includes a transparent substrate 241, a transparent transistor layer 242, a first transparent electrode 243, a transparent organic light-emitting layer 244, a second transparent electrode 245, and a connection electrode 246.

The transparent substrate 241 may be formed of a polymer material, such as plastic which has transparent characteristics, or may be formed of glass. A material of the transparent substrate 241 may be determined by an environment in which the transparent display apparatus 100 is applied. For example, since a polymer material is light and flexible, the polymer material may be used for a mobile display apparatus. Glass may be used for a show-window of a shop or a general window.

The transparent transistor layer 242 includes a transistor manufactured by replacing opaque silicon of an existing TFT with a transparent material such zinc oxide or titanium oxide (TiO). A source, a gate, a drain, and various dielectric layers 247 and 248 are provided in the transparent transistor layer 242. A connection electrode 246 for electrically connecting the drain to the first transparent electrode 243 may also be provided in the transparent transistor layer 242. In FIG. 3, only one transistor, which consists of the source, the gate, and the drain in the transparent transistor layer 242, is illustrated. However, practically, a plurality of transparent transistors, which are distributed over an entire area on a surface of the display, are provided. The control unit 200 may display information by applying a control signal to a gate of the respective transistors inside the transparent transistor layer 242, and driving the corresponding transparent transistor.

The first transparent electrode 243 and the second transparent electrode 245 are disposed in an opposite direction from each other, with the transparent organic light-emitting layer 244 therebetween. The first transparent electrode 243, the transparent organic light-emitting layer 244, and the second transparent electrode 245 form a transparent OLED.

The transparent OLED may be classified into a passive matrix OLED (PMOLED) and an active matrix OLED (AMOLED), according to a driving method. With regard to the PMOLED, a pixel is formed in an area in which the first transparent electrode 243 and the second transparent electrode 245 cross each other. On the contrary, the AMOLED has a structure which includes a TFT which drives each pixel. FIG. 3 illustrates a structure of the AMOLED.

The first transparent electrode 243 and the second transparent electrode 245 respectively include a plurality of line electrodes. The plurality of line electrodes are aligned vertically with each other. For example, if lines electrodes of the first transparent electrode 243 are arranged in a horizontal direction, line electrodes of the second transparent electrode 245 are arranged in a vertical direction. Thus, a plurality of crossing areas are formed between the first transparent electrode 243 and the second transparent electrode 245. A transparent transistor, as illustrated in FIG. 3, is connected to the respective crossing areas.

The control unit 200 may use the transparent transistor to form a potential difference for each crossing area. In the crossing area in which a potential difference is formed, an electron and a hole, from each electrode, flow to and combine in the transparent organic light-emitting layer 244, thus emitting light. On the contrary, in a crossing area where a potential difference is not formed, light is not emitted. Thus, a rear background is transparently reflected.

The first transparent electrode 243 and the second transparent electrode 245 may be formed of indium tin oxide (ITO) or a new material such as a graphene. Graphene is a transparent material formed of carbon atoms which are connected to each other and form a planar structure shaped like a hive. Additionally, the transparent organic light-emitting layer 244 may also be implemented by using various materials.

As described above, the transparent display unit 240 may be implemented as various types such as a transparent LCD type, a transparent TFEL type, a transparent OLED type, or a transmissive type. In a case of the transmissive type, like a head-up display (HUD), an image is projected and displayed on a transparent screen.

Figure 4:
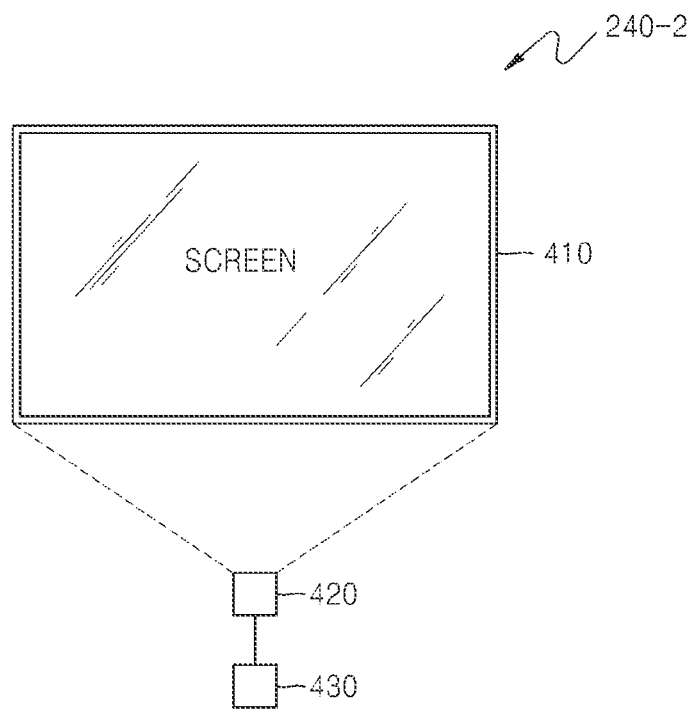
FIG. 4 is a diagram illustrating another example of a detailed configuration of a transparent display unit that may be applied to the transparent display apparatus.

FIG. 4 is a diagram illustrating another example of a detailed configuration of a transparent display unit that may be applied to the transparent display apparatus. FIG. 4 shows a detailed configuration of the display unit 240 which is implemented as a transparent display apparatus.

A transmissive-type transparent display unit 240-2 may include a transparent screen 410, an optical device 420, and a light-source device 430.

The light-source device 430 generates light for displaying information by using various types of light sources such as a vacuum fluorescent display (VFD), a cathode ray tube (CRT), an LCD, or an LED.

The optical device 420 transmits and projects light, emitted from the light-source device 430, to the transparent screen 410. The optical device 420 may be implemented by using a light-guiding plate which includes at least one or more lenses and mirrors.

The light-source device 430 and the optical device 420 may be implemented as one display module. Accordingly, the light-source device 430 and the optical device 420 may be disposed on upper, lower, left, and right edge portions of the transparent screen 410, and may project light to the transparent screen 410, so as to display information. Additionally, the light-source device 430 and the optical device 420 may be implemented by using a holographic method. In this case, the light-source device 430 and the optical device 420 may display information directly on the transparent screen 410 by using a laser.

The transparent screen 410 may be formed of general glass or an arbitrary transparent material.

Figure 5:
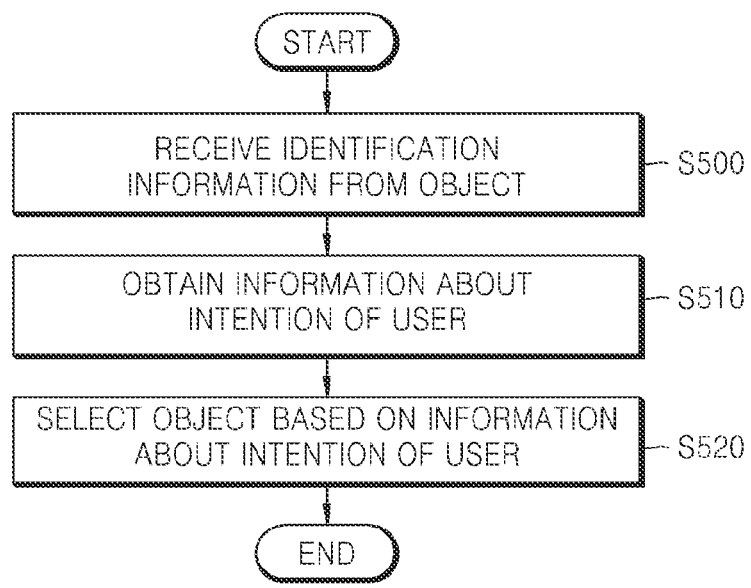
FIG. 5 is a flowchart illustrating a process of selecting an object, by the transparent display apparatus, according to an exemplary embodiment.

FIG. 5 is a flowchart illustrating a process of selecting an object, by the transparent display apparatus 100, according to an exemplary embodiment.

First, in operation S500, the transparent display apparatus 100 receives identification information from the object 110. The identification information about the object 110 may include an ID for identifying the object 110 or information for accessing the object 110. For example, an IP address of the object 110 may be included in the identification information about the object 110. The transparent display apparatus 100 may identify the object 110 based on the received identification information.

Then, the transparent display apparatus 100 may obtain information about an intention of the user 120. The information about the intention of the user 120 is information for determining the object 110 that may be selected by the user 120. The information about the intention of the user 120 may be determined by using various input methods.

Then, in operation S520, the transparent display apparatus 100 may select an object, according to the information about the intention of the user. Additionally, the transparent display apparatus 110 may selectively display information about the object 110 located in an area which may be viewed by the user 120. The object 110 located in the area which may be viewed by the user 120 is the object 110 located in an area which the user 120 views through the transparent display of the transparent display unit 110 at a location of the user 120, like a first object 110-1 and a second object 110-2 shown in FIG. 24.

The information about the object 110 may be obtained by receiving the information from the object 110 which corresponds to identification information about the object 110 that may be displayed by the transparent display apparatus 100, or by searching for information that corresponds to identification information about the object 100 from information stored in a storage medium.

Figure 6:
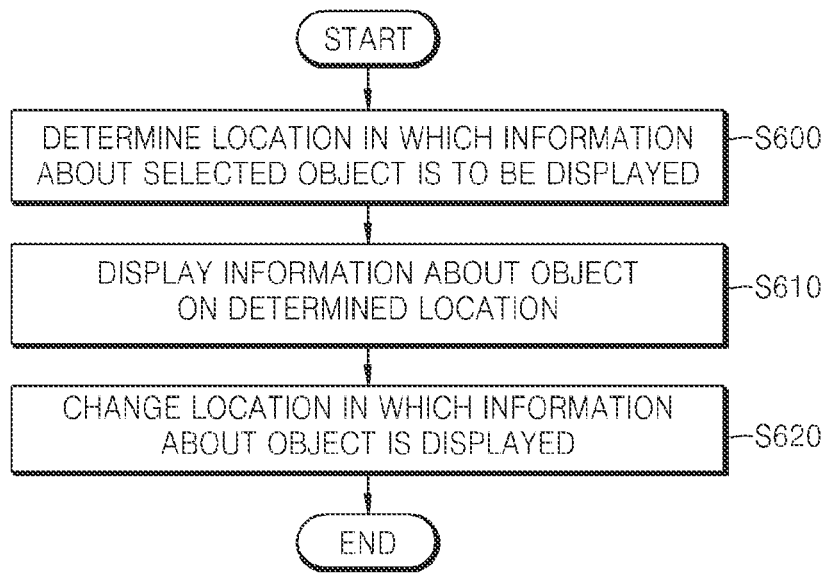
FIG. 6 is a flowchart illustrating a process of displaying information about an object, by the transparent display apparatus, according to an exemplary embodiment.

FIG. 6 is a flowchart illustrating a process of displaying information about an object, by the transparent display apparatus 100, according to an exemplary embodiment.

First, in operation S600, the transparent display apparatus 100 may determine a location in which information about an object is to be displayed on the display unit 240. The transparent display apparatus 100 may determine a location in which information about the object is displayed, according to a relative locations between the transparent display apparatus 100, the user 120, and the object 110. A method of determining information about the object will be explained later, when FIG. 7 is explained.

Then, in operation S610, the transparent display apparatus 100 may display information about the object 110 in a determined location. The information about the object 110 is information related to the object 110, and is provided to the user 120 via the transparent display apparatus 100. For example, the information about the object 110 may include information such as a name, a model name, and identification information of the object 110. Additionally, according to an exemplary embodiment, the information about the object 110 may include an image which represents a shape of the object 110. A shape of the object 110 may be displayed on the object 110 that the user 120 may view through the transparent display apparatus 100.

Then, in operation S620, the transparent display apparatus 100 may change a location in which the information about the object 110 is displayed. For example, the user 120 may change a location, in which the information about the object 110 is displayed, via a touch input of a shape of the object 110 displayed on the transparent display apparatus 100. Additionally, as another example, as a location of the user 120, the transparent display apparatus 100, or the object 110 is changed, the location, in which the information about the object 110 is displayed, may be changed. The location, in which the information about the object 110 is displayed, may be changed according to a location of the user 120 or the object 110 detected by the user detection unit 210 and the object selection unit 220. Otherwise, the location, in which the information about the object 110 is displayed, may be changed according to a motion of the transparent display apparatus 110 recognized from a motion recognition sensor included in the transparent display apparatus 110. For example, when the transparent display apparatus 110 moves toward a lower part of the transparent display apparatus 110, the location, in which the information about the object 110 is displayed, may be changed to move toward an upper part of the transparent display apparatus 110.

Figure 7:
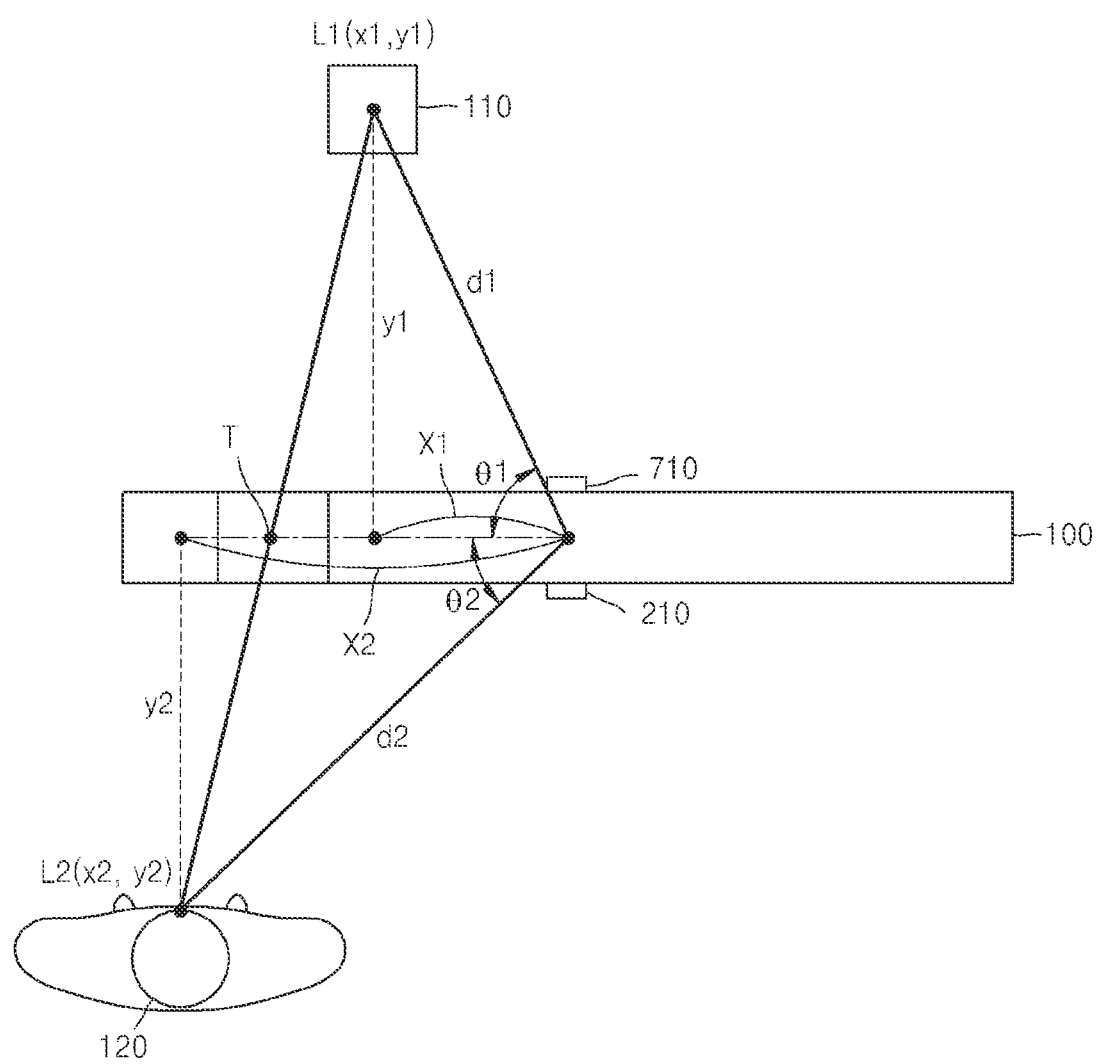
FIG. 7 is a diagram illustrating a method of determining, by the transparent display apparatus, a location in which information is displayed according to a location of a user and an object, according to an exemplary embodiment.

FIG. 7 is a diagram illustrating a method of determining, by the transparent display apparatus 100, a location in which information is displayed according to a location of a user and an object, according to an exemplary embodiment.

Referring to FIG. 7, the user detection unit 210 for detecting a location of a user may be installed at an upper center of the transparent display apparatus 100. Additionally, a location identifying unit 710 which is included in an object selection unit and identifies a location of the object 110 may be installed at an upper center of the transparent display apparatus 100.

A location of the location identifying unit 710 may be changed by using a method of detecting, by the location identification unit 710, a location of the object 110, or according to an exemplary embodiment.

As illustrated in FIG. 7, when a location of the user detection unit 210 and a location of the location identifying unit 710 correspond to each other, their corresponding point is defined as an origin (0, 0), an actual location of the object 110 is assumed as L1(x1, y1), and a location of the user 120 is assumed as L2(x2, y2).

If the user detection unit 210 and the location identifying unit 710 are respectively implemented by using a depth camera, the location identifying unit 710 may detect a distance d1 between the transparent display apparatus 100 and the object 110, and an angle θ1 between a direction of the object 110 and a surface of the transparent display apparatus 100, by using a rear background image captured at the location identifying unit 710. Additionally, the user detection unit 210 may detect a distance d2 between the transparent display apparatus 100 and the user 120, and an angle θ2 between a direction of the user 120 and a surface of the transparent display apparatus 100, by using a front background image captured at the user detection unit 210.

The object selection unit 220 may calculate x1, y1, x2, and y2 respectively by using a trigonometric function. That is, it is calculated that d1*sin θ1=y1 and d1*cos θ1=x1. Additionally, it is calculated that d2*sin θ2=y2 and d2*cos θ2=x2. Accordingly, when x1, y1, x2, and y2 are calculated, a linear equation for connecting a point L1 to a point L2 is obtained. That is, an equation such as y=(y1−y2)*x/(x1−x2)+y1−(y1−y2)*x1/(x1−x2) may be obtained. That is, a point T, which is an area of the transparent display unit 240 through which the user 120 may view the object, may be calculated as ((x2y1−x1y2)/y1−y2), 0). Accordingly, the transparent display unit 240 may display information about the object 110 on the point T which is calculated by the object selection unit 220.

In FIG. 7, the point T is described as a coordinate value. However, according to an exemplary embodiment, an area within a certain distance from the point T may be determined as an area for which information about the object 110 is displayed.

In FIG. 7, the user detection unit 210 and the location identifying unit 710 are respectively illustrated as one device. However, the user detection unit 210 and the location identifying unit 710 may include a plurality of devices. For example, the user detection unit 210 and the location identifying unit 710 may include a plurality of cameras.

Figure 8:
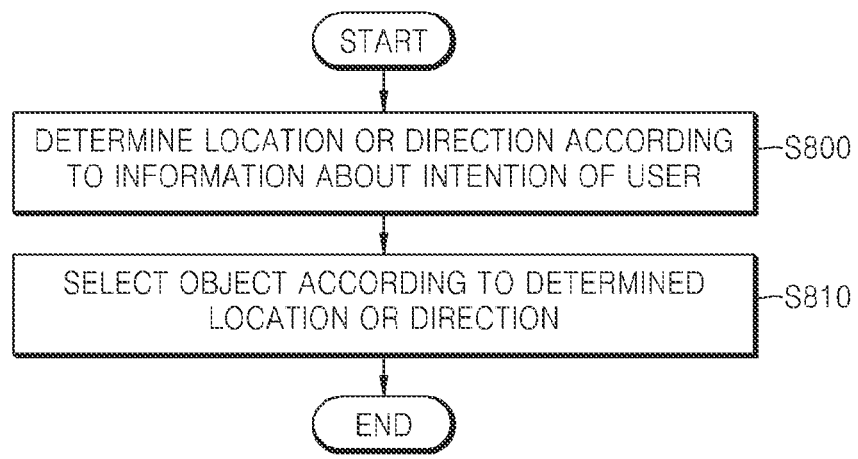
FIG. 8 is a flowchart illustrating a process of selecting an object, according to an exemplary embodiment.

FIG. 8 is a flowchart illustrating a process of selecting an object, according to an exemplary embodiment.

First, in operation S800, the transparent display apparatus 100 may determine a location or a direction, according to information about an intention of the user 120. The location or the direction means a location or a direction relative to the transparent display apparatus 100.

Additionally, the information about an intention of the user 120 may include information for determining a location or a direction. According to an exemplary embodiment, the information about the intention of the user 120 may include information about a gaze direction of the user 120. The information about a gaze direction of the user 120 may include information obtained by using various methods such as eye tracking or face recognition. Additionally, according to another exemplary embodiment, the information about the intention of the user 120 may include information about a location of the user 120 and a touch input. For example, if the information about the intention of the user 120 includes information about a touch input to a location of the user 120 and the portion T, the object selection unit 220 may determine a direction according to an extended line of a line connecting a location of the user 120 to the T portion.

Then, in operation S810, the object selection unit 220 may select the object 110 according to the determined location or direction. According to an exemplary embodiment, the object selection unit 220 may identify the object 110 located in the determined location or direction and select the identified object. A method of identifying an object located in a determined location or direction will be explained later, when FIGS. 9 through 19 are explained.

Figure 9:
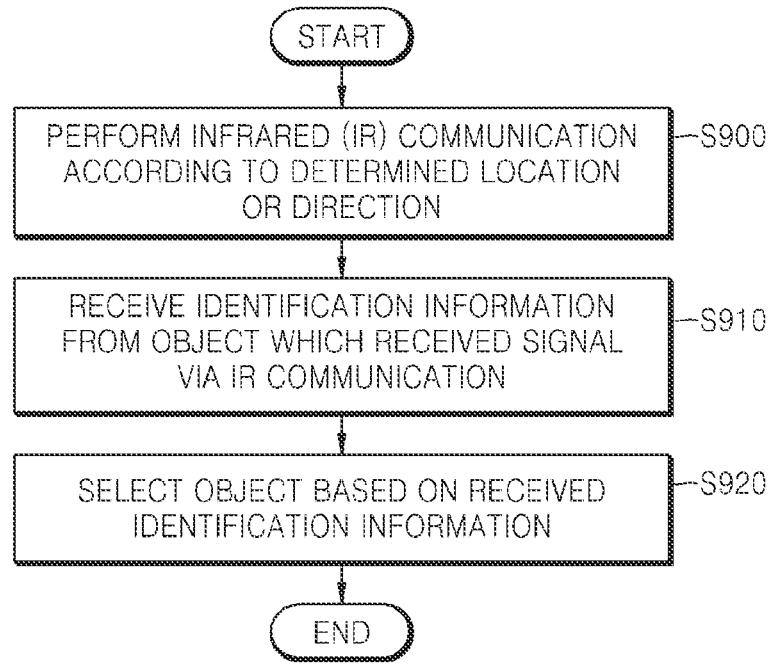
FIG. 9 is a flowchart illustrating a process of selecting an object by using infrared (IR) communication, according to an exemplary embodiment.

FIG. 9 is a flowchart illustrating a process of selecting an object by using infrared (IR) communication, according to an exemplary embodiment.

According to an exemplary embodiment, the object selection unit 220 may include the location detection unit 710 for identifying a direction in which the object 110 is located. Additionally, the location identifying unit 710 may include an IR communication module that may transmit and receive an IR signal in a predetermined direction.

Additionally, in the current exemplary embodiment, the IR communication module is described. However, the IR communication may be replaced by a different communication method that allows communication in a predetermined direction, such as an optical sensor or a light-emitting device.

In operation S900, the location identifying unit 710 may emit an IR signal in a direction, for example determined in S800. Then, in operation S910, the location identifying unit 710 may receive identification information from the object which has received the IR signal. For example, when an IR signal with a predetermined pattern is emitted in a direction determined in operation S900, the object 110, located in the direction in which the IR signal is emitted, may recognize the IR signal with a predetermined pattern by using an IR receiver, and thus, transmit the identification information to the transparent display apparatus 100. The identification information may be transmitted via an arbitrary communication element which is connected between the object 110 and the transparent display apparatus 100.

Then, in operation S920, the objection selection unit 710 may select an object based on the received identification information. For example, when the identification information, received in operation S920, is respectively a, b, and c, and if the identification information received in operation S910 is b after an IR signal is emitted in operation S900, the object 110, whose identification information corresponds to b, may be selected.

Figure 10:
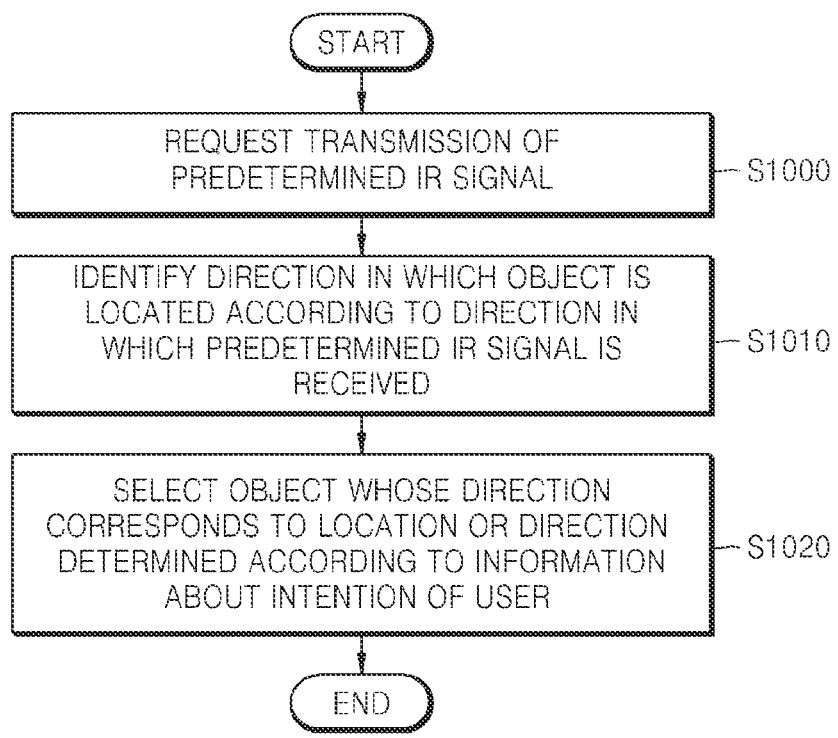
FIG. 10 is a flowchart illustrating a process of selecting an object by using IR communication, according to another exemplary embodiment.

FIG. 10 is a flowchart illustrating a process of selecting an object by using IR communication, according to another exemplary embodiment.

According to an exemplary embodiment, the object selection unit 220 may include the location detection unit 710 for identifying a direction in which the object 110 is located. Additionally, the location identifying unit 710 may include an IR communication module that may transmit and receive an IR signal in a predetermined direction.

Additionally, in the current exemplary embodiment, the IR communication module is described. However, the IR communication may be replaced by a different communication method that allows communication in a predetermined direction, such as an optical sensor or a light-emitting device.

In operation S1000, the transparent display apparatus 100 may transmit information for requesting transmission of a predetermined IR signal respectively to one or more objects 110 communicatively connected via the information transmitting and receiving unit 230. Then, the location identification unit 710 of the transparent display apparatus 100 may identify a direction in which the one or more objects are located, according to a direction in which a predetermined IR signal is received. For example, the transparent display apparatus 100 may request transmission of IR signals of different patterns to the respective one or more objects 110, identify the one or more objects 100 according to a pattern of the received IR signal, and detect a direction in which the one or more objects are located, according to a direction in which the IR signal is received.

Then, in operation S1020, the object selection unit 220 may select an object 110 which is located in the direction identified in operation S800, from among the one or more objects whose direction is detected in operation S1010.

Figure 11:
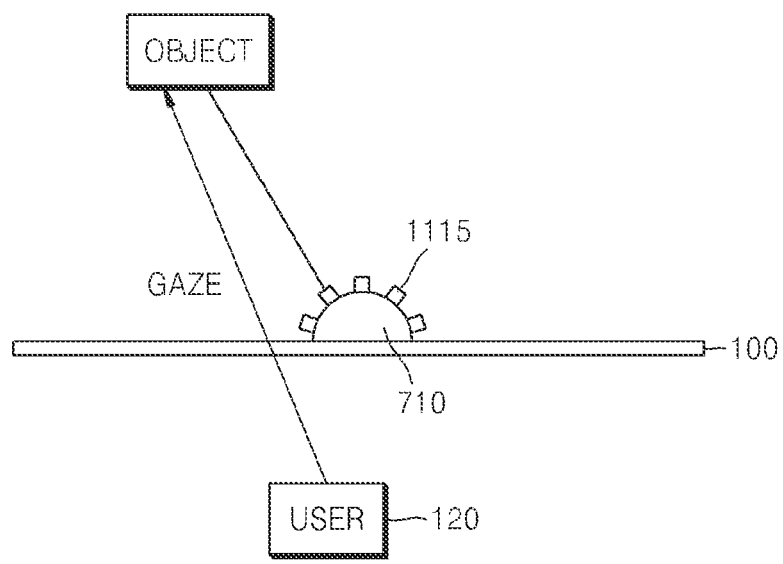
FIG. 11 is a flowchart illustrating a method of, by using IR communication, identifying a direction in which an object is located, according to an exemplary embodiment.

FIG. 11 is a flowchart illustrating a method of, by using IR communication, identifying a direction in which an object is located, according to an exemplary embodiment.

The object selection unit 220 of the transparent display apparatus 100 may include the location identifying unit 710 which includes a plurality of IR communication modules 1115 for identifying a location of the object 100.

According to an exemplary embodiment, as illustrated in FIG. 11, the IR communication modules 1115 are arranged in several directions for emitting an IR signal in several directions or receiving an IR signal from several directions. However, the location identifying unit 710 may also include only one IR communication module 1115, and may be implemented to change a direction of the IR communication module 1115.

According to an exemplary embodiment, the location identifying unit 710 may transmit an IR signal to the object 110 according to a gaze direction of the user 120. Alternatively, according to a direction of an IR signal received from one or more objects 110, the location identifying unit 710 may identify a direction in which the object 110 is located.

In FIG. 11, the transparent display apparatus 100 is illustrated to include one location identifying unit 710. However, the transparent display apparatus 100 may include the location identifying unit 710 in several locations. Thus, accuracy of identifying a location of the object 110 may improve.

Figure 12:
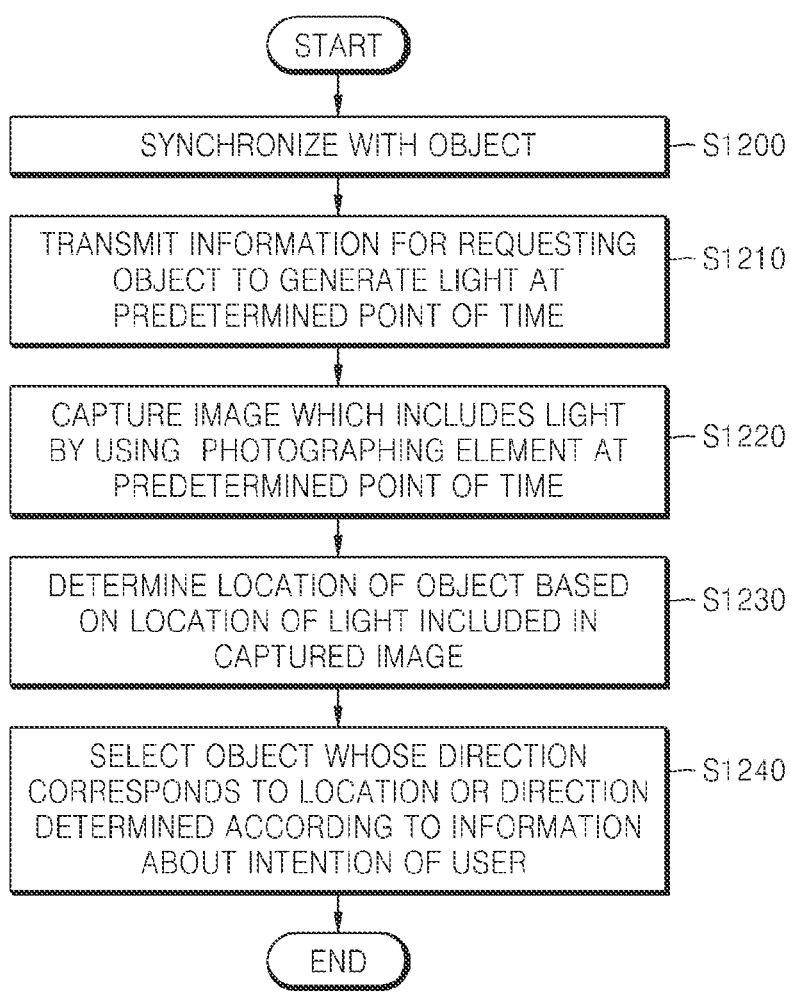
FIG. 12 is a flowchart illustrating a process of selecting an object by using light generated from a light-emitting device included in the object, according to an exemplary embodiment.

FIG. 12 is a flowchart illustrating a process of selecting an object by using light generated from a light-emitting device included in the object, according to an embodiment of the present general inventive concept.

First, in operation S1200, the transparent display apparatus synchronizes with the object 110. Then, in operation S1210, the transparent display apparatus 100 may transmit information, for requesting the object 110 to generate light, to the object 110 at a predetermined point of time via the information transmitting and receiving unit 230.

When the object 110 generates the light at the predetermined point of time according to the information transmitted to the object 110 in operation S1210, the location identifying unit 710, which includes an imaging element, captures an image which includes the light at the predetermined point of time in operation S1220.

Then, in operation S1230, the location identifying unit 710 may determine a location of the object, based on a location of the light included in the image. Then, the object selection unit 220 may select an object whose direction, determined in operation S1230, corresponds to a location or a direction determined according to information about an intention of the user 120, in operation S1240.

Figure 13:
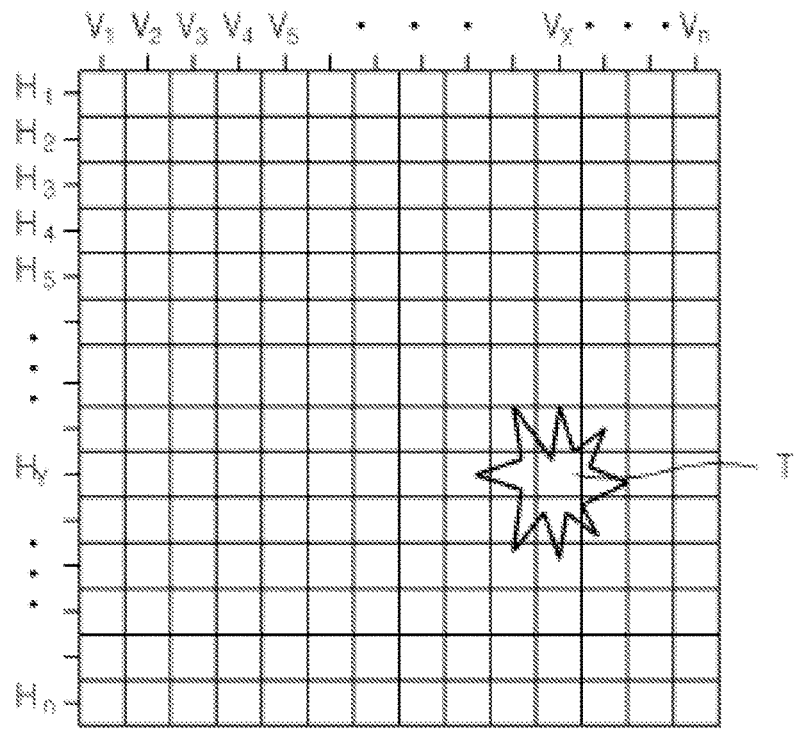
FIG. 13 is a diagram illustrating a process of determining a location of an object by using light generated from a light-emitting device included in the object, according to an exemplary embodiment.

FIG. 13 is a diagram illustrating a process of determining a location of an object by using light generated from a light-emitting device included in the object, according to an exemplary embodiment. In FIG. 13, an image captured at the location identifying unit 710 is divided into a plurality of blocks, according to an exemplary embodiment.

Referring to FIG. 13, the location identifying unit 710 may divide a captured image into areas which are formed of a plurality of vertical lines V1 through Vx and a plurality of horizontal lines V1 through Vy. The divided areas may be arranged in a pattern of a matrix.

Respective cells in the matrix may consist of one pixel. However, the respective cells may consist of a plurality of pixels.

The location identifying unit 710 may determine a lightest area as a location in which light is photographed. In FIG. 13, a point (Vx, Hy) may be determined as a location in which the light is photographed. The location identifying unit 710 may match a location or a direction of the object 110, according to a location in which the light is photographed. Conversely to a method of calculating a point T when the point T is (Vx, Hy) in FIG. 7, a location of the object 110 may be obtained according to a location of a user and a location of the point T. According to the obtained location of the object 110, the object selection unit 220 may select the object 110 which is located in a place which corresponds to a location or a direction, determined according to information about an intention of the user.

Figure 14:
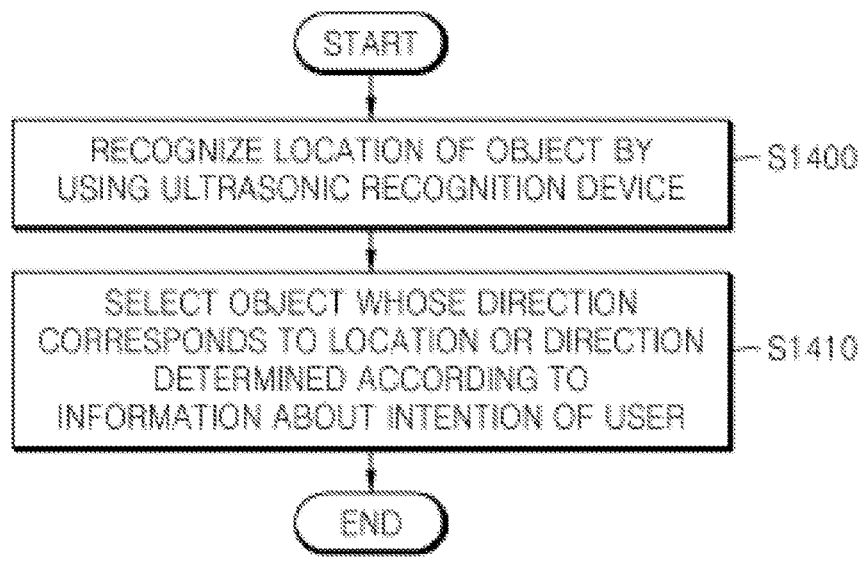
FIG. 14 is a flowchart illustrating a process of selecting an object by using an ultrasonic recognition device, according to an exemplary embodiment.

FIG. 14 is a flowchart illustrating a process of selecting an object by using an ultrasonic recognition device, according to an exemplary embodiment.

First, in operation S1400, the location identifying unit 710, included in the object selection unit 220, may recognize a location of the object 110 by using an ultrasonic recognition device. An ultrasonic recognition device measures a distance between a beacon 1510 and a receiver 1520 by using a time difference between an ultrasonic wave and a wireless communication wave, and then, finds a location by using three or more distances. A propagation speed of an ultrasonic wave is about 343 m/sec. A propagation speed of a wireless communication wave is the same as the speed of light, and thus, propagation time of the wireless communication wave is estimated to be about 0. Therefore, a distance may be measured by using difference between a point of time when an ultrasonic wave reaches the location identifying unit 710 from the object 110 and a point of time when a wireless communication wave reaches the location identifying unit 710 from the object 110.

Then, in operation S1410, the object selection unit 220 may select the object 110 whose location corresponds to a location or a direction determined by information about an intention of the user 120, from among one or more objects 110 whose location is identified by the location identifying unit 710.

Figure 15:
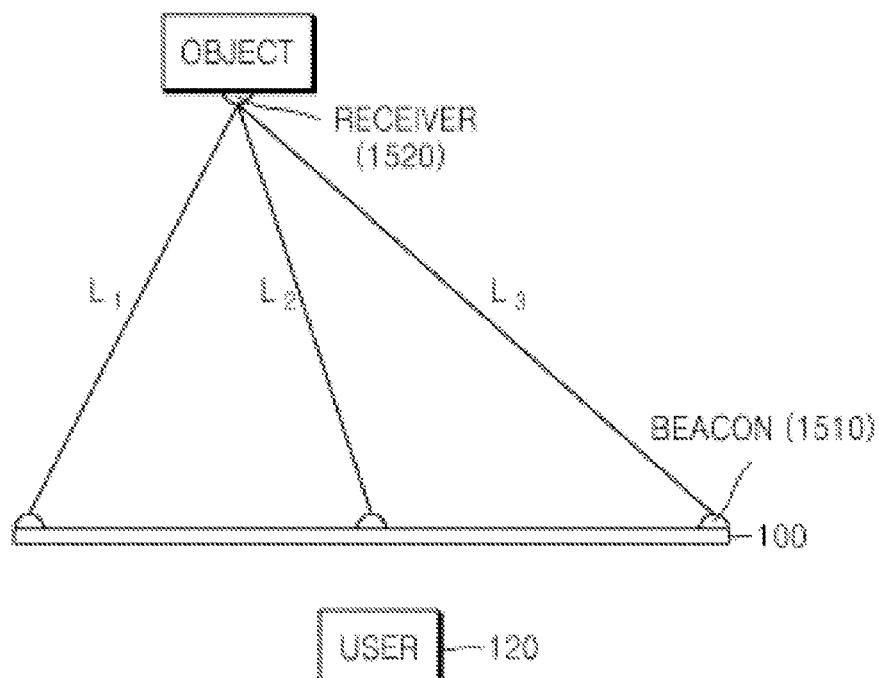
FIG. 15 is a flowchart illustrating a process of recognizing a location of an object by using an ultrasonic recognition device, according to an exemplary embodiment.

FIG. 15 is a flowchart illustrating a process of recognizing a location of an object by using the ultrasonic recognition device, according to an exemplary embodiment.

The transparent display apparatus 100, according to an exemplary embodiment, may include a plurality of beacons 1510. The receiver 1520, included in the object 110, may receive an ultrasonic wave and a wireless communication wave generated from the beacon 1510. When the object 110 receives an ultrasonic wave and a wireless communication wave via the receiver 1520, the object 110 may transmit information about a location of the object 110 to the transparent display apparatus 100. According to an exemplary embodiment, the information about a location of the object 110 may include information about a point of time when the receiver 1520 receives an ultrasonic wave and a wireless communication wave from each beacon 1510, information about distances L1 through L3 between the receiver 1520 and the beacons 1510 obtained according to a point of time when the ultrasonic wave and the wireless communication wave are received, and information for identifying a location of the object 110, such as a coordinate of the object 110, obtained by using a distance between the receiver 1520 and the beacon 1510.

The distance between the beacon 1510 and the receiver 1520 may be calculated by using $L=Cus(Tus-Trf)$, using a difference between an arrival time of an ultrasonic wave Tus and an arrival time of a wireless communication wave Trf. 'L' in the formula is a distance between the beacon 1510 and the receiver 1520, and 'Cus' is a propagation speed of an ultrasonic wave.

The transparent display apparatus 100 may identify a location of the object 110, by obtaining a distance between the respective beacons 1510 and the receiver 1520.

Figure 16:
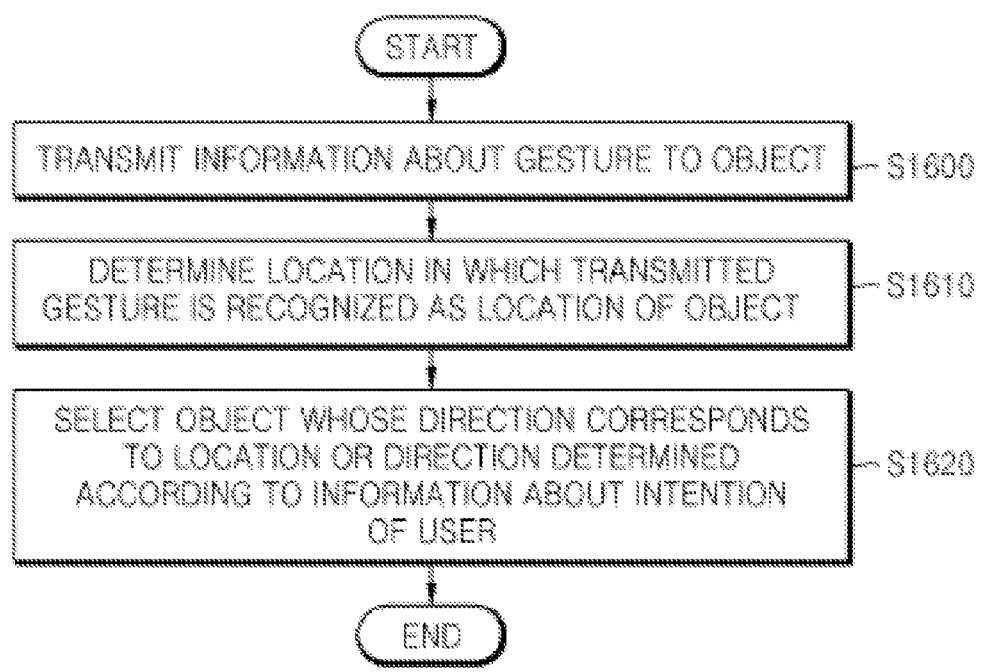
FIG. 16 is a flowchart illustrating a process of selecting an object by using gesture recognition, according to an exemplary embodiment.

FIG. 16 is a flowchart illustrating a process of selecting an object by using gesture recognition, according to an exemplary embodiment.

First, in operation S1600, the transparent display apparatus 100 may transmit information about a gesture to the object 110 via the information transmitting and receiving unit 239. The information about a gesture may include a gesture requested to be performed by a user 1710 of the object 110, which is in a location of the object whose location is to be identified, to identify a location of the object 110.

Additionally, according to an exemplary embodiment, the transparent display apparatus 100 may display information which corresponds to the first object 110-1 and the second object 110-2 on the transparent display unit 240. Then, the transparent display apparatus 100 may transmit information about a gesture to the object 110 selected by a touch input of the user 120 with regard to the displayed information on the transparent display apparatus 100.

Then, the location identifying unit 710 recognizes the gesture included in the information about the transmitted gesture. In operation S1610, the location identifying unit 710 may determine a location of the object according to a location in which the gesture is recognized. For example, when information about requesting a gesture of raising a hand is transmitted to the first object 110-1, the transparent display apparatus 100 recognizes the gesture of raising a hand by a user who is in the location of the first object 110-1. Thus, the transparent display apparatus 100 identifies the location of the first object 110-1.

Then, in operation S1620, the object selection unit 220 may select an object whose location or direction corresponds to a location or a direction which is determined according to information about an intention of the user 120, according to a location of the object 120 identified in operations S1600 through S1610.

Figure 17:
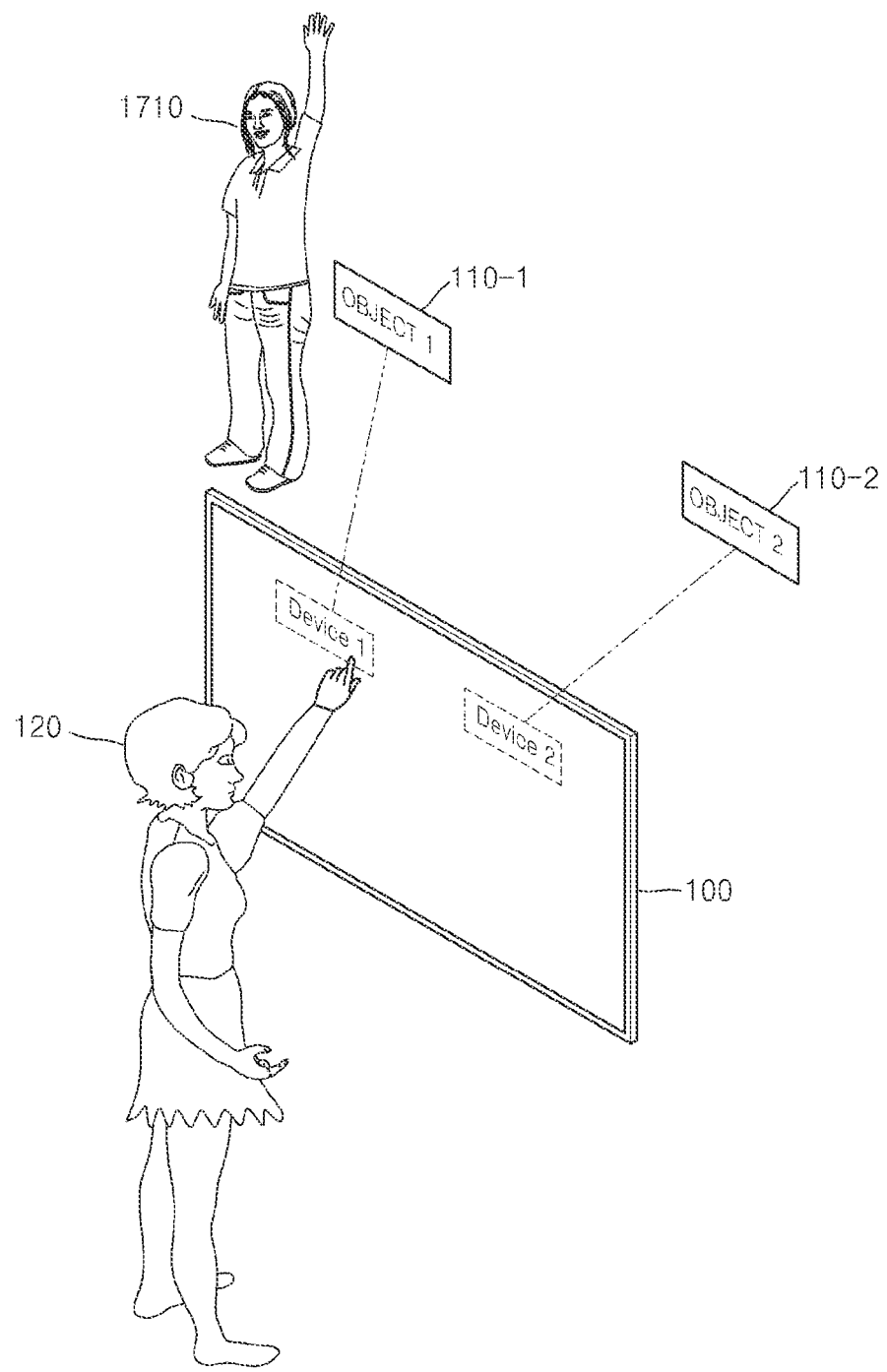
FIG. 17 is a flowchart illustrating a process of determining a location of an object by using gesture recognition, according to an exemplary embodiment.

FIG. 17 is a flowchart illustrating a process of determining a location of an object by using gesture recognition, according to an exemplary embodiment.

The transparent display apparatus 100 may display information which corresponds to the first object 110-1 and the second object 110-2 and, according to an input by the user 120 with regard to the displayed information, and may transmit information about a gesture to the first object 110-1.

Then, the transparent display apparatus 100 may recognize a gesture of the user who is in a location of the first object 110-1, thus determining a location of the user 1710, which is in a location of the first object 110-1, as a location of the first object 110-1.

Figure 18:
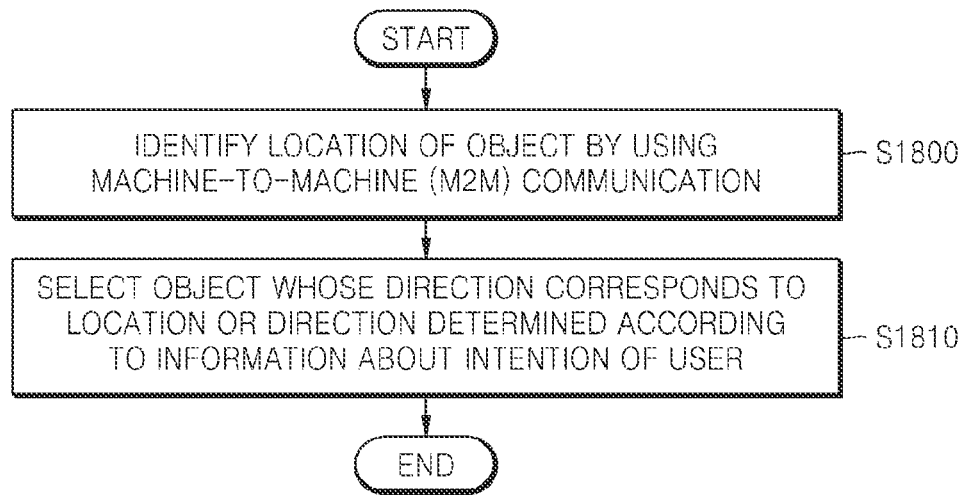
FIG. 18 is a flowchart illustrating a process of selecting an object by using machine-to-machine (M2M) communication, according to an exemplary embodiment.

FIG. 18 is a flowchart illustrating a process of selecting an object by using machine-to-machine (M2M) communication, according to an exemplary embodiment.

In operation S1800, the location identifying unit 710 may identify a location of at least one object 110 by using M2M communication. The M2M communication refers to a network which combines sensor and communication functions with an object, thus intelligently collecting and mutually exchanging information. The M2M communication allows contextual awareness and location information identification by using various devices.

According to an exemplary embodiment, objects may communicate with each other, and identify a location of objects. The transparent display apparatus 100 receives a location of objects from one of the objects by using the M2M communication, thus identifying a location of objects.

Then, in operation S1810, the object selection unit 220 may select objects 110-1 through 110-3, whose location corresponds to a location or a direction determined by information about an intention of the user 120. For example, if the information about an intention of the user 120 is a gaze direction to an object, the object selection unit 220 may select an object which is placed in a location which corresponds to the gaze direction of the user 120.

Figure 19:
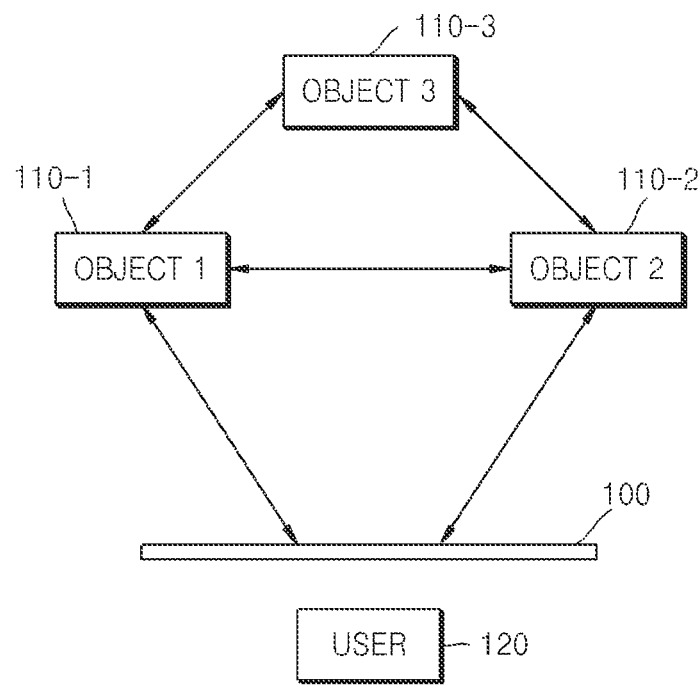
FIG. 19 is a diagram illustrating a method of identifying a location of an object by using M2M communication, according to an exemplary embodiment.

FIG. 19 is a diagram illustrating a method of identifying a location of an object by using M2M communication, according to an exemplary embodiment.

Respective objects 110-1 through 110-3 may communicate with each other, and locations of the respective objects 101-1 through 110-3 may be identified. For example, based on the strength of a signal received from a plurality of access points (APs), a distance between the respective objects 110-1 through 110-3 and respective APs is obtained. Then, locations of the respective objects 110-1 through 110-3 may be identified according to a location of the plurality of APs and a distance from the plurality of APs to the respective objects 110-1 through 110-3.

The transparent display apparatus 100 receives locations of the respective objects 110-1 through 110-3 from one of the objects 110-1 through 110-3 by using the M2M communication. Thus, the transparent display apparatus 100 may identify a location of the objects 110-1 through 110-3 and select the object. For example, if information about an intention of the user 120 is a gaze direction to the first object 110-1, the object selection unit 220 of the transparent display apparatus 100 may select the first object 110-1.

Figure 20:
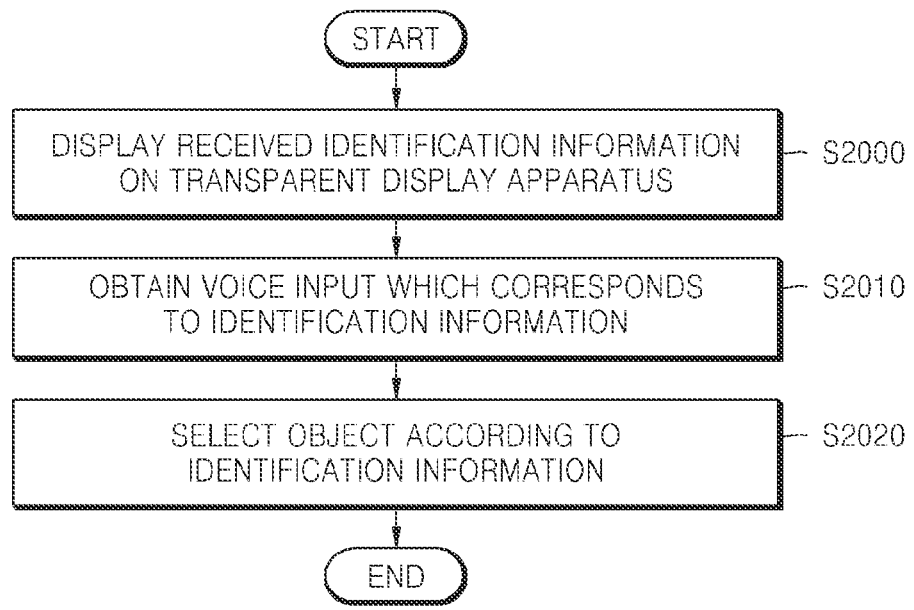
FIG. 20 is a flowchart illustrating a process of selecting an object by using voice recognition, according to an exemplary embodiment.

FIG. 20 is a flowchart illustrating a process of selecting an object by using voice recognition, according to an exemplary embodiment.

First, in operation S2000, the object selection unit 220 may display identification information received from the object 100 on the transparent display unit 240. The identification information displayed on the transparent display unit 240 may include information for classifying the object 100, for example, a television, a refrigerator, or an air conditioner.

Then, in operation S2010, the object selection unit 220 may obtain a voice input which corresponds to the identification information. The object selection unit 220 includes the location identification unit 710 which obtains a voice input. The location identification unit 220 converts voice information, which is input through voice recognition, to text, and compares the converted text to the identification information. Thus, the object selection unit 220 may determine whether the voice input corresponds to the identification information.

Then, in operation S2020, the object selection unit 220 may select the object 110 according to the identification information.

Figure 21:
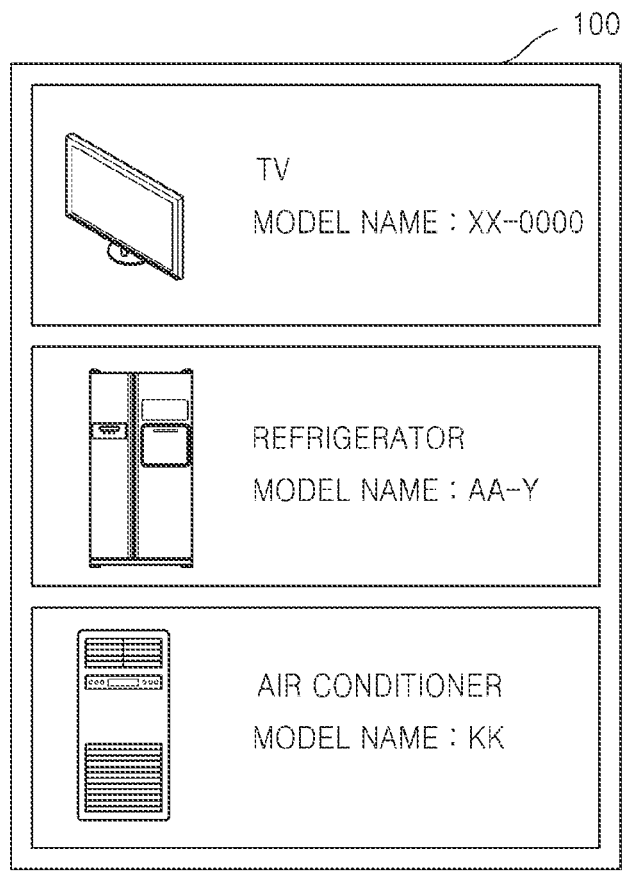
FIG. 21 is a diagram illustrating an example of displaying identification information about an object, by the transparent display apparatus, according to an exemplary embodiment.

FIG. 21 is a diagram illustrating an example of displaying identification information about an object, by the transparent display apparatus 100, according to an exemplary embodiment.

The transparent display apparatus 100 may list and display identification information, which is received by the transparent display unit 240. The identification information displayed on the transparent display unit 240 may include object-related information, in addition to a type, a model name, and an image of the object, as shown in FIG. 21.

Figure 22:
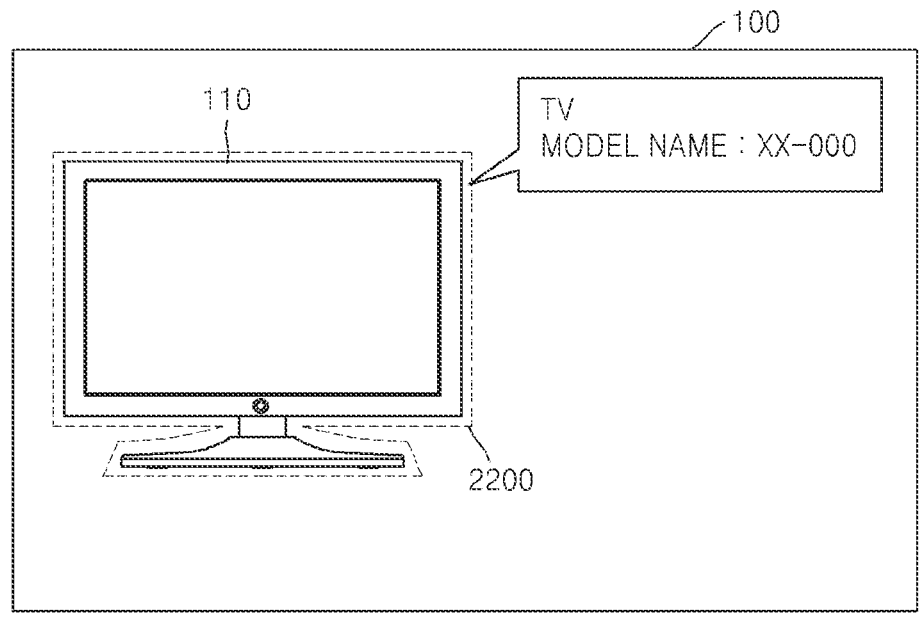
FIG. 22 is a diagram illustrating an example of displaying identification information about an object, by the transparent display apparatus, according to another exemplary embodiment.

FIG. 22 is a diagram illustrating an example of displaying identification information about an object, by the transparent display apparatus 100, according to another exemplary embodiment.

The transparent display apparatus 100 may display identification information of an object and information about the object through the transparent display unit 240, as shown in FIG. 22. For example, the transparent display apparatus 100 may display a shape 2000 of the object 100 and identification information about the object received from the object 110.

The object 110, shown in FIG. 22, is transmitted through the transparent display unit 240, and thus, viewed by a user. The object 110 is not an image displayed on the transparent display unit 240. The shape 2200 of the object 110 is an image which is output by the transparent display unit 240. A location, in which the shape 2000 is displayed on the transparent display unit 240, may be determined according to a location of the user 120, the transparent display apparatus 100, and the object 110. By determining a location of displaying the shape 2000 of the object 110 on the transparent display unit 240 according to a location of the user 120, the transparent display apparatus 100, and the object 120, the shape 2000 of the object 110 may seem to overlap the object 110 to the user 120. The shape 2000 of the object 110 may be information about various types of the object 110 that may be output as an image such as another image or text, as well as a contour of the object 110.

Figure 23:
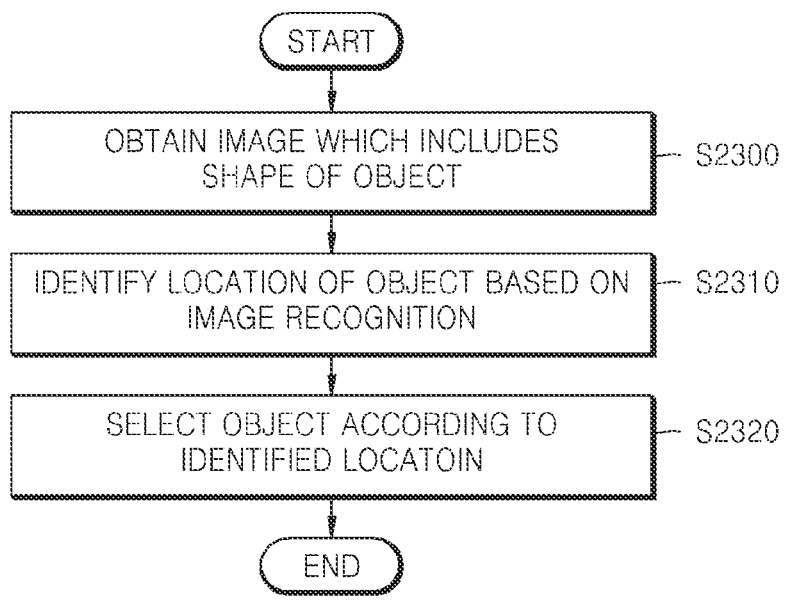
FIG. 23 is a flowchart illustrating a process of selecting an object based on image recognition, according to an exemplary embodiment.

FIG. 23 is a flowchart illustrating a process of selecting an object based on image recognition, according to an exemplary embodiment.

In operation S2300, the location identifying unit 710 may obtain an image which includes a shape of the object 110 through a photographing element included in the transparent display apparatus 100. Then, in operation S2310, the location identifying unit 710 may identify a location of the object based on image recognition.

The transparent display apparatus 100 may receive identification information which includes information about a shape of an object from the object 110. Based on the received shape of the object 110, the location identifying unit 710 may identify a location included in an image in which the shape of the object 110 is obtained. The location identifying unit 710 may estimate a location of the object 110, according to a location which includes the shape of the object 110 in the image.

For example, the obtained image is divided into a plurality of areas, and the respective areas may be mapped to predetermined directions or locations. The location identifying unit 710 may determine a direction or location mapped to an area which includes a shape of the object 110 in the image. Accordingly, the object 110 may be selected according to the identified location, in operation S2320.

Figure 24:
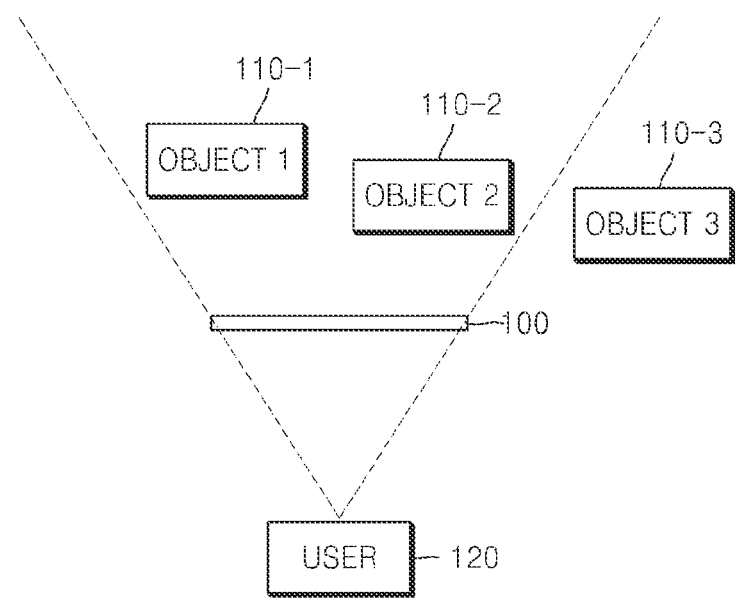
FIG. 24 is a diagram for explaining a method of selecting an object located in an area that a user may view through the transparent display apparatus, according to an exemplary embodiment.

FIG. 24 is a diagram for explaining a method of selecting an object located in an area that may be seen by a user through the transparent display apparatus, according to an exemplary embodiment.

The transparent display apparatus 100 may selectively receive identification information about an object located in an area that a user may view through the transparent display apparatus 100. As illustrated in FIG. 24, the transparent display apparatus 100 may receive only information about the first object 110-1 and the second object 110-2 that may be viewed through the transparent display apparatus 100 from a location of the user 120, and may not receive identification information about a third object 110-3.

Additionally, according to another exemplary embodiment, a transparent display apparatus 100 may selectively display information only about the objects 110-1 and 110-2 that may be viewed through the transparent display apparatus 100 from a location of the user 120, from among information about at least one object 110.

Figure 25:
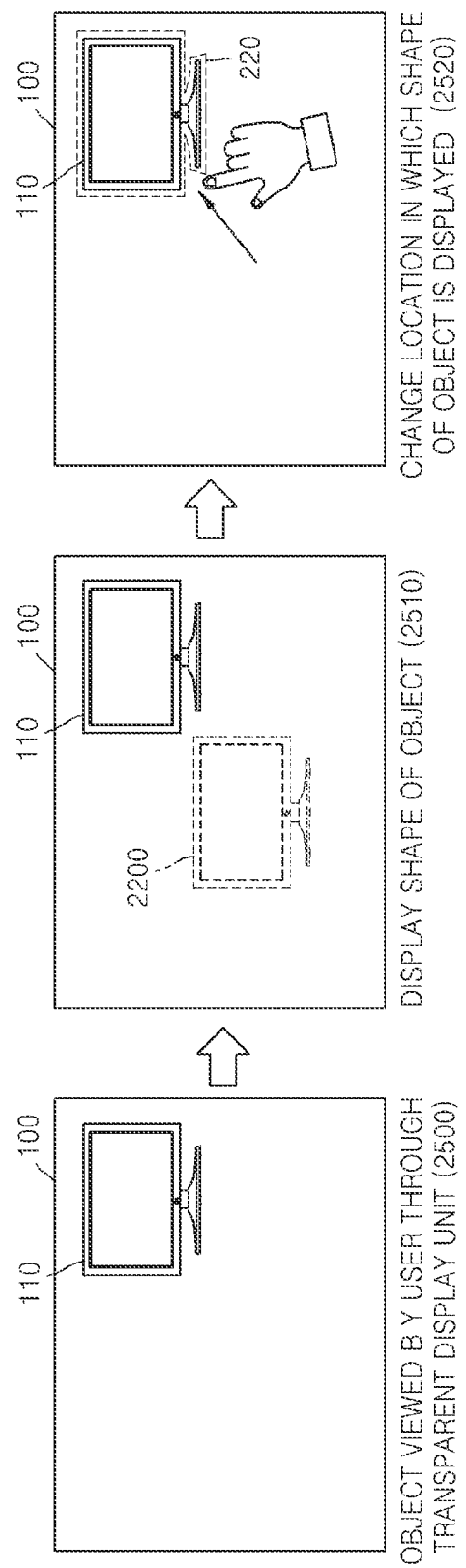
FIG. 25 is an example for explaining a method of changing a location in which information about an object, displayed on the transparent display apparatus, is displayed, according to an exemplary embodiment.

FIG. 25 is an example for explaining a method of changing a location in which information about an object, displayed on the transparent display apparatus 100, is displayed, according to an exemplary embodiment.

In operation 2500, the user 120 may view the object 110 through the transparent display unit 240. The transparent display apparatus 100 may display information related to the object 100 on the transparent display unit 240. In operation 2510, the information related to the object 100 may include a shape 2000 of the object 110.

The shape 2200 of the object 110 may be displayed on a location in which the user 120 may view the object 110 through the transparent display unit 240. However, if locations of the transparent display apparatus 100, the user 120, and the object 110 are not accurately identified, information related to the object 110 may not be displayed in an accurate location. Accordingly, in operation 2520, a location including the information related to the displayed object 110 may be changed according to a user input.

The transparent display apparatus 100 may change a location, in which information related to the object 110 is displayed, according to a motion of the transparent display apparatus 100, the user 120, and the object 110. For example, when the object 100 moves left, a location in which the information related to the object 110 is displayed may move according to a motion of the object 110.

The exemplary embodiments can be implemented in recording-medium forms which include executable program commands such as program modules executed by a computer. The computer readable recording medium is any usable device that can be accessed by a computer system, and includes volatile and non-volatile, removable and non-removable media. Additionally, the computer readable recording medium may include a computer storage medium and a communication medium. The computer storage medium includes a volatile and non-volatile, removable and non-removable medium that may be implemented by using an arbitrary method for technology for storing information such as a computer readable command, a data structure, a program module, or other data. The communication medium includes a computer readable command, a data structure, a program module, other data of a modulated data signal such as a carrier, or other transmission mechanisms. The communication medium also includes an arbitrary information transmission medium.

While the exemplary embodiments have been particularly shown and described, it will be understood by those of ordinary skill in the art that various changes in form and details may be made therein without departing from the spirit and scope of the present general inventive concept as defined by the following claims. Accordingly, the exemplary embodiments described herein should be considered in descriptive sense only and not for purposes of limitation. For example, each element, described in a separate form, may be executed in a distributed form. Likewise, elements described in a separate form, may be executed in a combined form.

The concepts above must not be confined to the exemplary embodiments, and the following patent claims as well as everything including variations equal or equivalent to the patent claims pertain to the scope of the present invention.

What is claimed is:

1. An object selection method of a transparent display apparatus interposed between a user and a plurality of objects, the method comprising:
   transmitting, by the transparent display apparatus, a request for transmission of an infrared (IR) signal to the plurality of objects which are randomly located;
   receiving, by the transparent display apparatus, IR signals that are respectively transmitted from the plurality of the objects and differ among the plurality of objects;
   identifying directions, in which the plurality of objects are respectively located, according to patterns of the IR signals and directions from which the IR signals have been respectively received;
   receiving, at the transparent display apparatus, a touch input at a position on the transparent display apparatus that indicates a selection of an object from among the plurality of objects by the user;
   determining a direction between the user and the position on the transparent display apparatus based on a location of the user and the position on the transparent display apparatus; and
   selecting the object, based on an intersection between a first line taken on the direction between the user and the position on the transparent display apparatus that passes through the transparent display apparatus and a second line taken on an identified direction in which the object is located relative to the transparent display apparatus.

2. The method of claim 1, further comprising:
   determining a location, at which information about the selected object is to be displayed on a screen of the transparent display apparatus, based on the location of the user and a location of the object; and
   displaying the information about the selected object on the screen at the determined location.

3. The method of claim 2, wherein the displaying of the information about the object comprises displaying a shape of the object.

4. The method of claim 2, further comprising changing the determined location at which the information about the selected object is displayed, according to an input.

5. The method of claim 1, wherein the object is a first object, and the method further comprises selecting a second object from among the plurality of objects based on a viewing direction of the user.

6. The method of claim 1, wherein the object is a first object, and the method further comprises:
   performing infrared (IR) communication based on the location of the user or a viewing direction of the user;
   receiving identification information from a second object from among the plurality of objects based on a received signal through the IR communication; and
   selecting the second object, based on the received identification information.

7. The method of claim 1, wherein the object is a first object, and the method further comprises:
   synchronizing the transparent display apparatus with a second object from among the plurality of objects;
   transmitting information for requesting the second object to generate light at a predetermined point of time via a light-emitting device comprised in the second object;
   capturing an image which includes the light generated by the light-emitting device at the predetermined point of time;
   determining a location of the second object, based on a location of the light in the captured image; and selecting the second object based on the location of the second object.

8. The method of claim 1, wherein the object is a first object, and the method further comprises:
recognizing a location of a second object from among the plurality of objects by using an ultrasonic recognition device; and
selecting the second object based on the location of the second object.

9. The method of claim 1, wherein the object is a first object, and the method further comprises:
transmitting information about a gesture to a second object from among the plurality of objects;
recognizing the transmitted gesture;
determining a location in which the gesture is recognized as a location of the second object; and
selecting the second object based on the location of the second object.

10. The method of claim 1, wherein the object is a first object, and the method further comprises:
identifying a location of a second object from among the plurality of objects by using machine-to-machine (M2M) communication; and
selecting the second object based on the location of the second object.

11. The method of claim 1, wherein the object is a first object, and the method further comprises:
displaying identification information of a second object from among the plurality of objects on the transparent display apparatus;
receiving a voice input which corresponds to the identification information by using voice recognition; and
selecting the second object according to the identification information which corresponds to the voice input.

12. The method of claim 1, wherein the object is a first object, and the method further comprises:
selectively receiving identification information about a second object, from among the plurality of objects, which is located in an area that the user may view through the transparent display apparatus.

13. The method of claim 1, wherein the object is a first object, and the method further comprises:
receiving identification information from the plurality of objects; and
selectively displaying information about a second object which is located in an area that the user may view through the transparent display apparatus, from among the plurality of objects.

14. The method of claim 1, wherein the object is a first object, and the method further comprises:
identifying a location of a second object based on image recognition; and
selecting the second object based on the location of the second object.

15. A computer-readable storage medium having stored thereon a computer program, for performing the method of claim 1.

16. A transparent display apparatus, comprising:
a memory storing instructions; and
at least one processor configured to execute the stored instructions to:
transmit a request for transmission of an infrared (IR) signal to a plurality of objects randomly disposed on a first side of the transparent display apparatus;
receive IR signals that are respectively transmitted from the plurality of the objects and differ among the plurality of objects; and
identify directions, in which the plurality of objects are respectively located, according to patterns of the IR signals and directions from which the IR signals have been respectively received;
receive a touch input at a position on the transparent display apparatus that indicates a selection of an object from among the plurality of objects by a user disposed on a second side of the transparent display apparatus opposite the first side;
determine a direction between the user and the position on the transparent display apparatus based on a location of the user and the position on the transparent display apparatus; and
select the object, based on an intersection between a first line taken on the direction between the user and the position on the transparent display apparatus that passes through the transparent display apparatus and a second line taken on an identified direction in which the object is located relative to the transparent apparatus.

17. The transparent display apparatus of claim 16, wherein the processor is further configured to execute the stored instructions to:
determine a location at which information about the selected object is to be displayed on a screen of the transparent display apparatus, based on the location of the user and a location of the object; and
display the information about the selected object on the screen at the determined location.

18. The transparent display apparatus of claim 17, wherein the processor is configured to execute the stored instructions to display a shape of the object on the determined location.

19. The transparent display apparatus of claim 17, wherein the processor is further configured to execute the stored instructions to change the determined location at which the information about the selected object is displayed, according to a user input.

20. The transparent display apparatus of claim 16, wherein the object is a first object, and the processor is further configured to execute the stored instructions to select based on a viewing direction of the user.

21. The transparent display apparatus of claim 20, wherein the object is a first object, and the processor is further configured to execute the stored instructions to:
transmit information about a gesture to a second object from among the plurality of objects;
determine a location of the second object, according to a location at which the transmitted gesture is recognized; and
select the second object based on the location of the second object.

22. The transparent display apparatus of claim 16, wherein the object is a first object, and the processor is further configured to execute the stored instructions to:
perform IR communication based on the location of the user or a viewing direction of the user;
receive identification information from a second object, from among the plurality of objects based on a received signal from the IR communication module; and
select the second object based on the received identification information.

23. The transparent display apparatus of claim 16, wherein the object is a first object, and the processor is further configured to execute the stored instructions to:
transmit information for requesting a second object from among the plurality of objects to generate light at a predetermined point of time via a light-emitting device comprised in the second object;

capture an image which includes the light generated by the light-emitting device at the predetermined point of time;

determine a location of the second object, based on a location of the light in the captured image; and select the second object based on the location of the second object.

24. The transparent display apparatus of claim 16, wherein the object is a first object, and the processor is further configured to execute the stored instructions to:

identify a location of a second object from among the plurality of objects by using an ultrasonic recognition device; and select the second object based on the location of the second object.

25. The transparent display apparatus of claim 16, wherein the object is a first object, and the processor is further configured to execute the stored instructions to:

identify a location of a second object from among the plurality of objects by using machine-to-machine (M2M) communication; and select the object based on the location of the object.

26. The transparent display apparatus of claim 16, wherein the object is a first object, and the processor is further configured to execute the stored instructions to:

display identification information of a second object from among the plurality of objects;

obtain a voice input which corresponds to the identification information by using voice recognition; and select the second object according to the identification information which corresponds to the voice recognition.

27. The transparent display apparatus of claim 16, wherein the object is a first object, and the processor is further configured to execute the stored instructions to selectively receive identification information about a second object, from among the plurality of objects, which is located in an area that the user may view through the transparent display apparatus.

28. The transparent display apparatus of claim 16, wherein the object is a first object, and the processor is further configured to execute the stored instructions to:

receive identification information from the plurality of objects; and selectively display information about a second object which is located in an area that the user may view through the transparent display apparatus, from among the plurality of objects.

29. The transparent display apparatus of claim 16, wherein the object is a first object, and the processor is configured to execute the stored instructions to:

identify a location of a second object based on image recognition; and select the second object based on the location of the second object.

30. An object selection method of a transparent display apparatus interposed between a user and an object, the method comprising:

detecting the object in a random place, wherein the detecting comprises:

transmitting, by the transparent display apparatus, a request for transmitting a predetermined infrared (IR) signal to the object; and identifying a direction, in which the object is located, according to a direction from which the predetermined IR signal has been received;

receiving a touch input to a position on the transparent display apparatus that indicates a selection of the object by the user;

determining a distance d1 between the transparent display apparatus and the object;

determining an angle $\theta1$ between a direction of the object and a surface of the transparent display apparatus;

determining a distance d2 between the transparent display apparatus and the user;

determining an angle $\theta2$ between a direction of the user and a surface of the transparent display apparatus;

determining a location of the object relative to the transparent display apparatus based on d1 and $\theta1$;

determining a location of the user relative to the transparent display apparatus based on d2 and $\theta2$; and selecting the object, based on an intersection between a first line taken on a direction from the location of the object relative to the transparent display apparatus to the transparent display apparatus based on d1 and $\theta1$ and a second line taken on a direction from the location of the user relative to the transparent display apparatus to the position on the transparent display apparatus based on d2 and $\theta2$.

\* \* \* \* \*